Feb. 3, 1953 N. McINTYRE 2,627,151
SKEIN WINDING AND BANDING MACHINE
Filed July 2, 1951 23 Sheets-Sheet 1

INVENTOR:
NEWMAN McINTYRE

BY Eaton + Bell
ATTORNEYS.

Feb. 3, 1953 N. McINTYRE 2,627,151
SKEIN WINDING AND BANDING MACHINE
Filed July 2, 1951 23 Sheets-Sheet 5

INVENTOR:
NEWMAN McINTYRE.

BY Eaton + Bell

ATTORNEYS.

Feb. 3, 1953 N. McINTYRE 2,627,151
SKEIN WINDING AND BANDING MACHINE
Filed July 2, 1951 23 Sheets-Sheet 7

NEWMAN McINTYRE,
INVENTOR.

BY Eaton + Bell
ATTORNEYS.

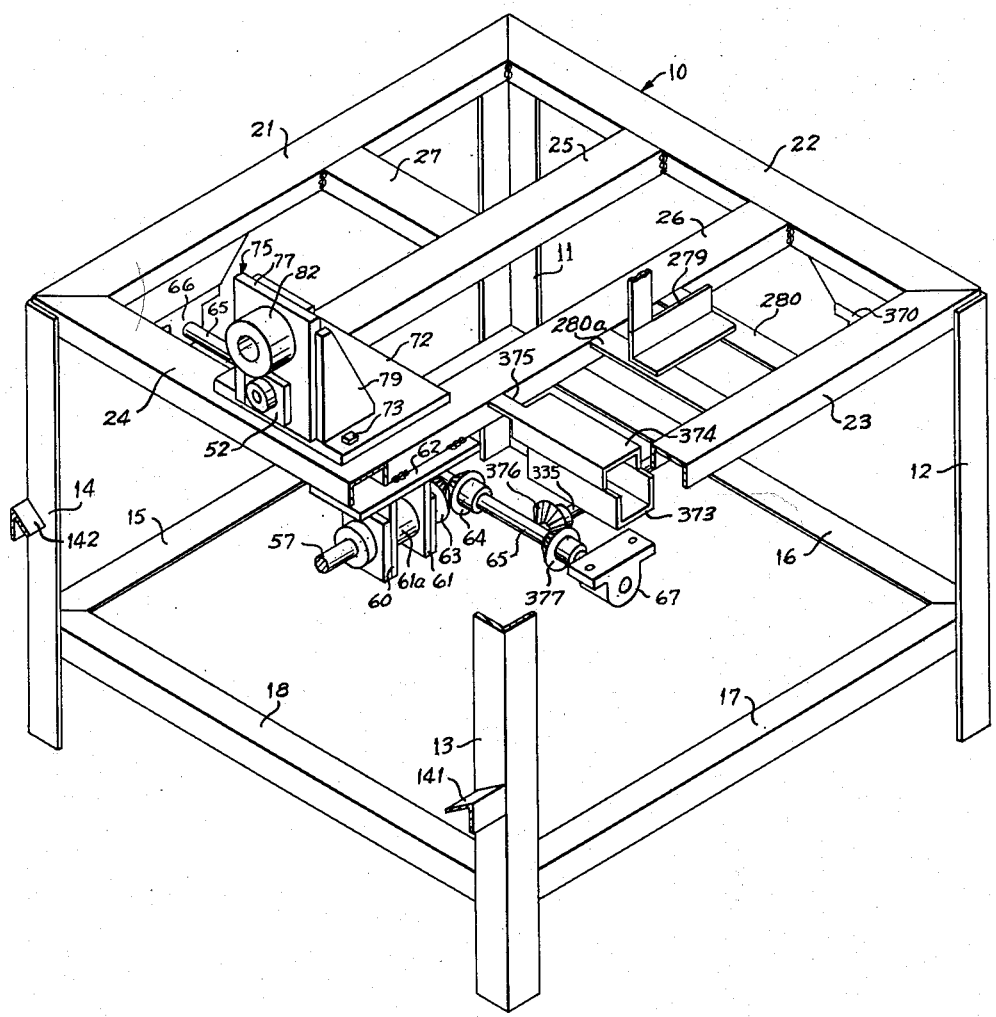

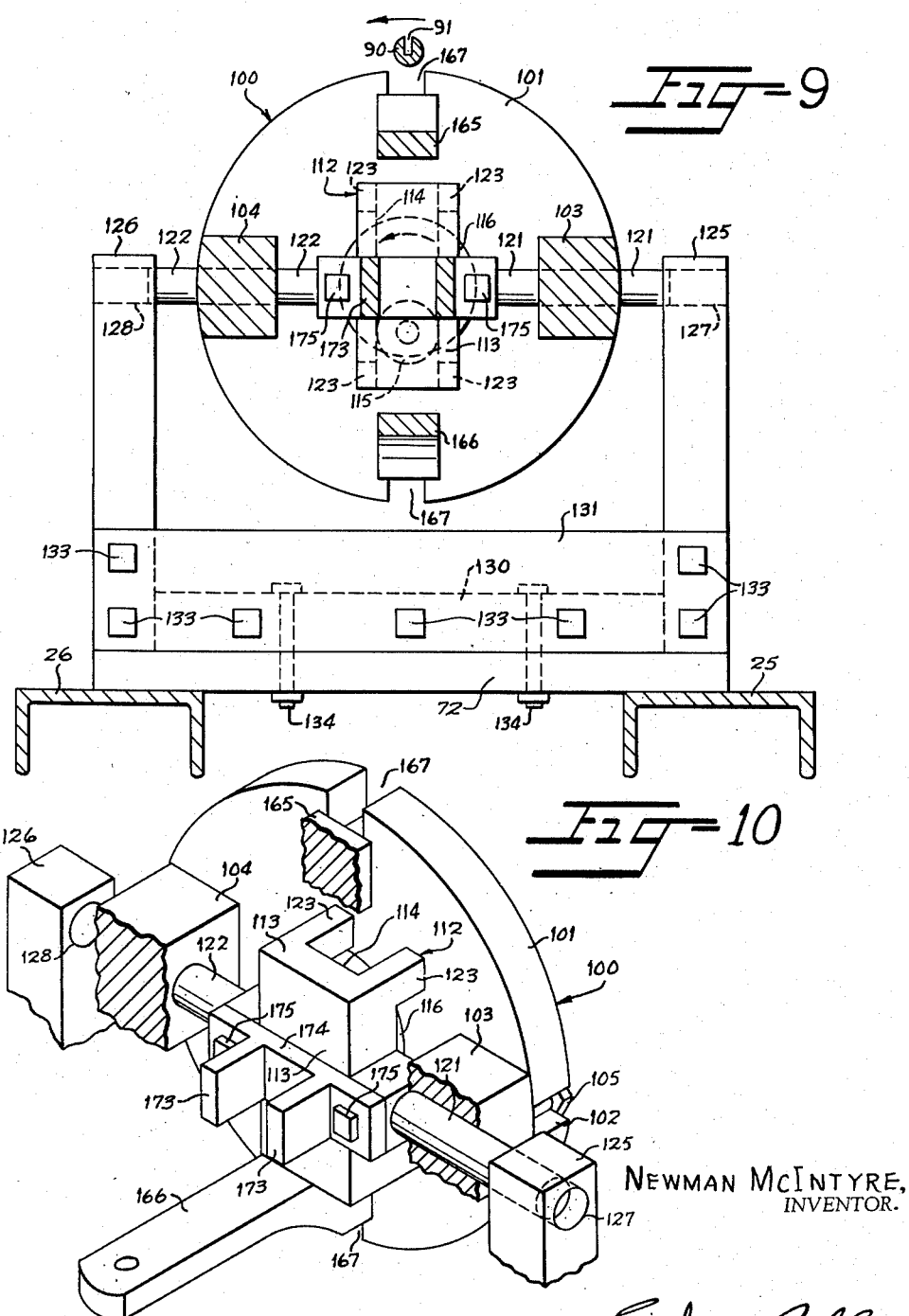

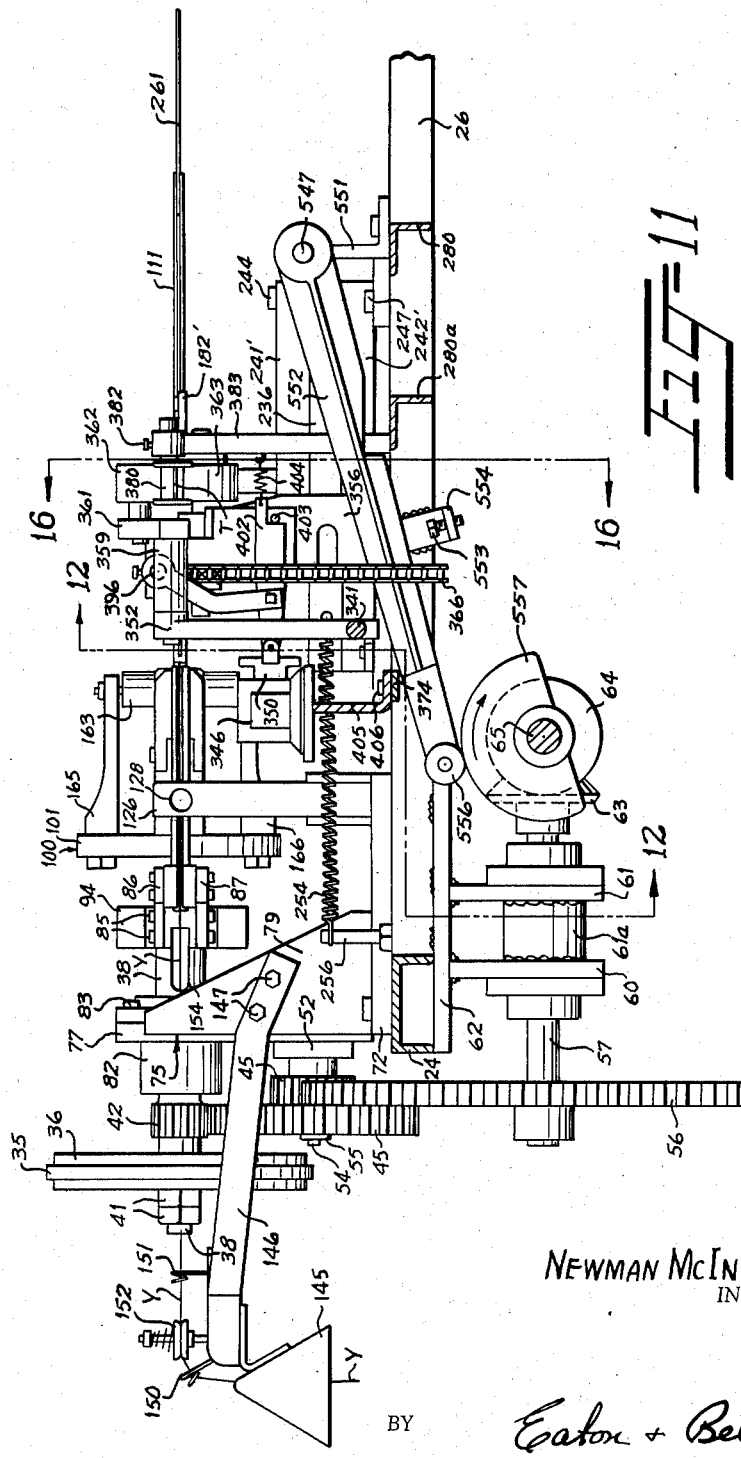

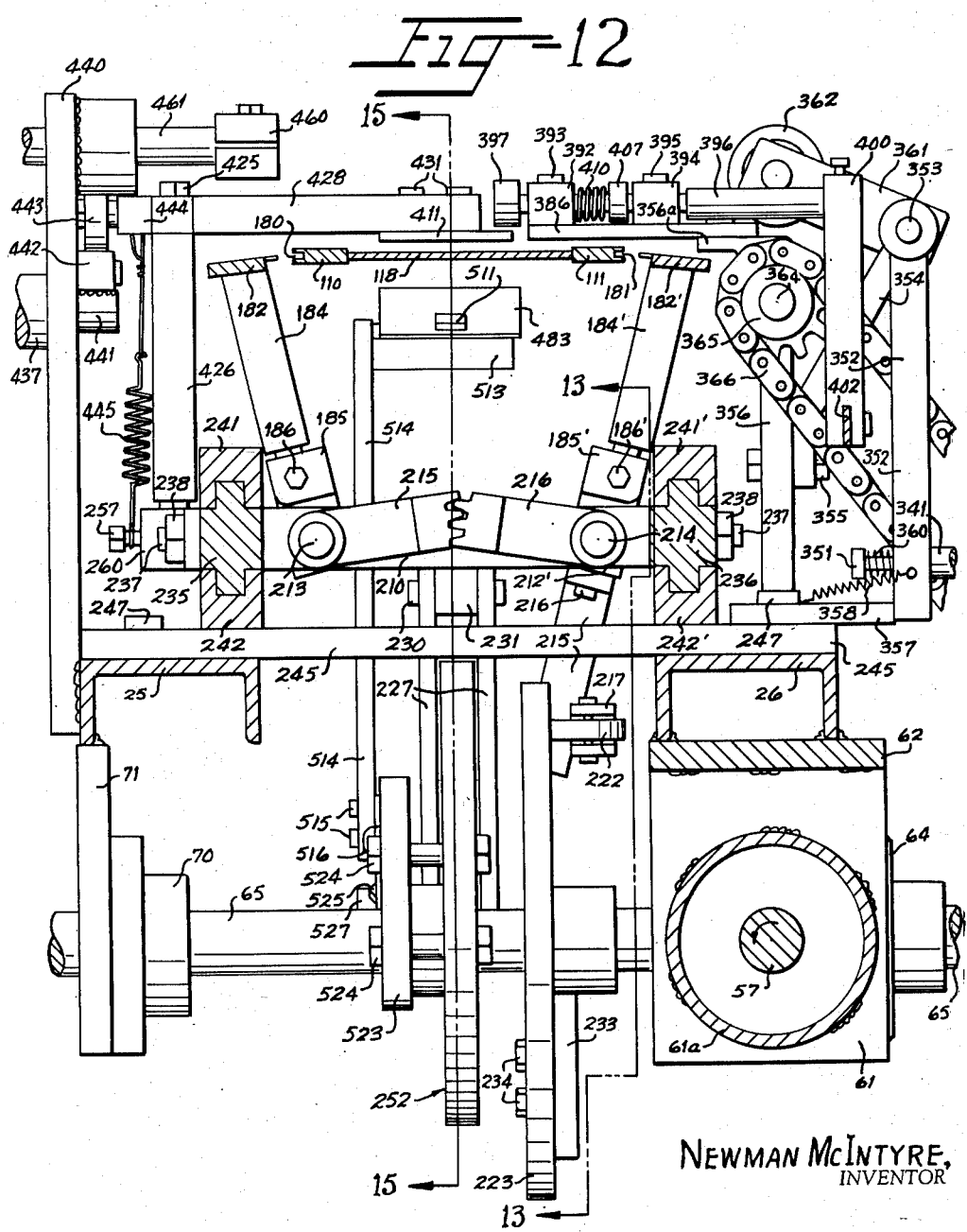

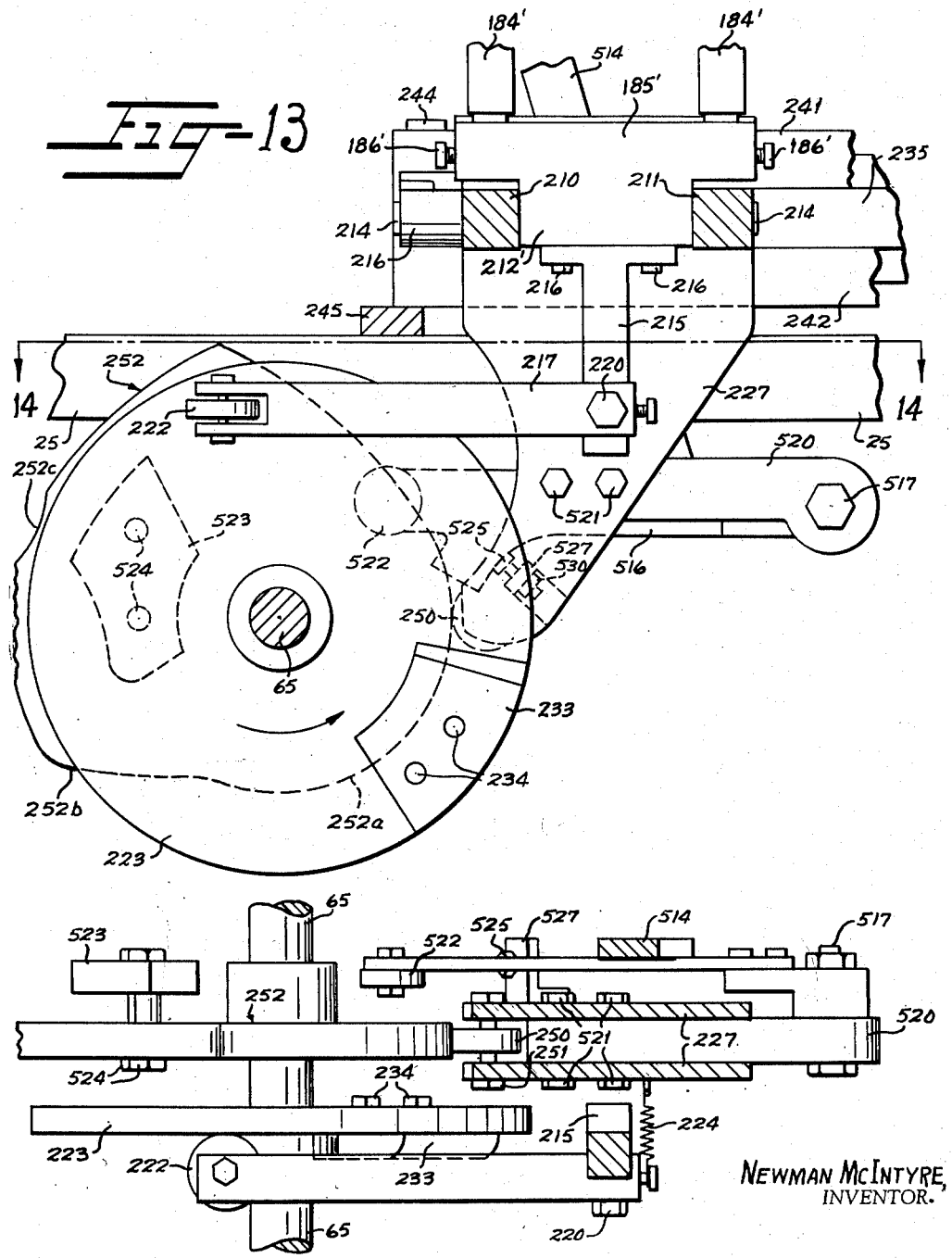

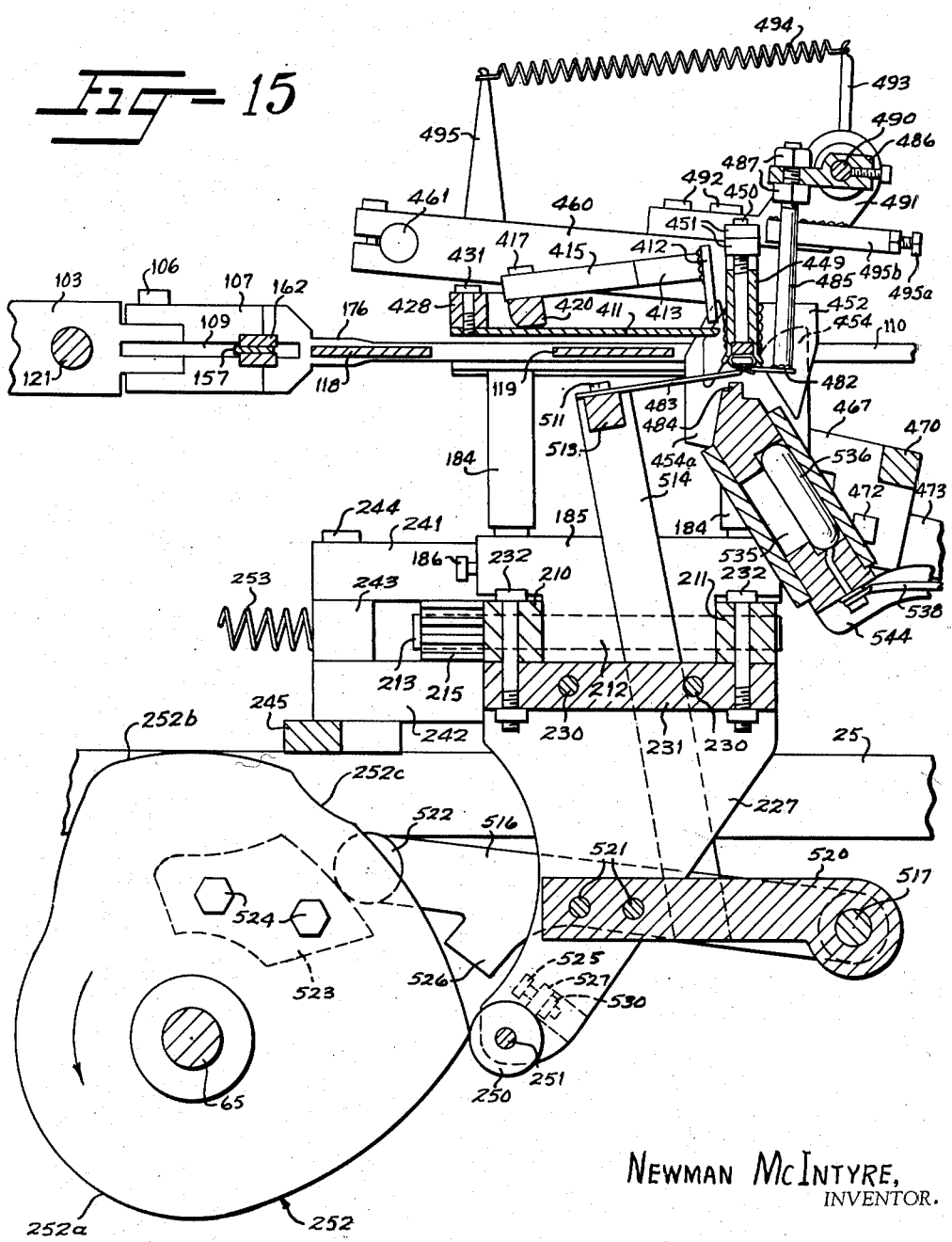

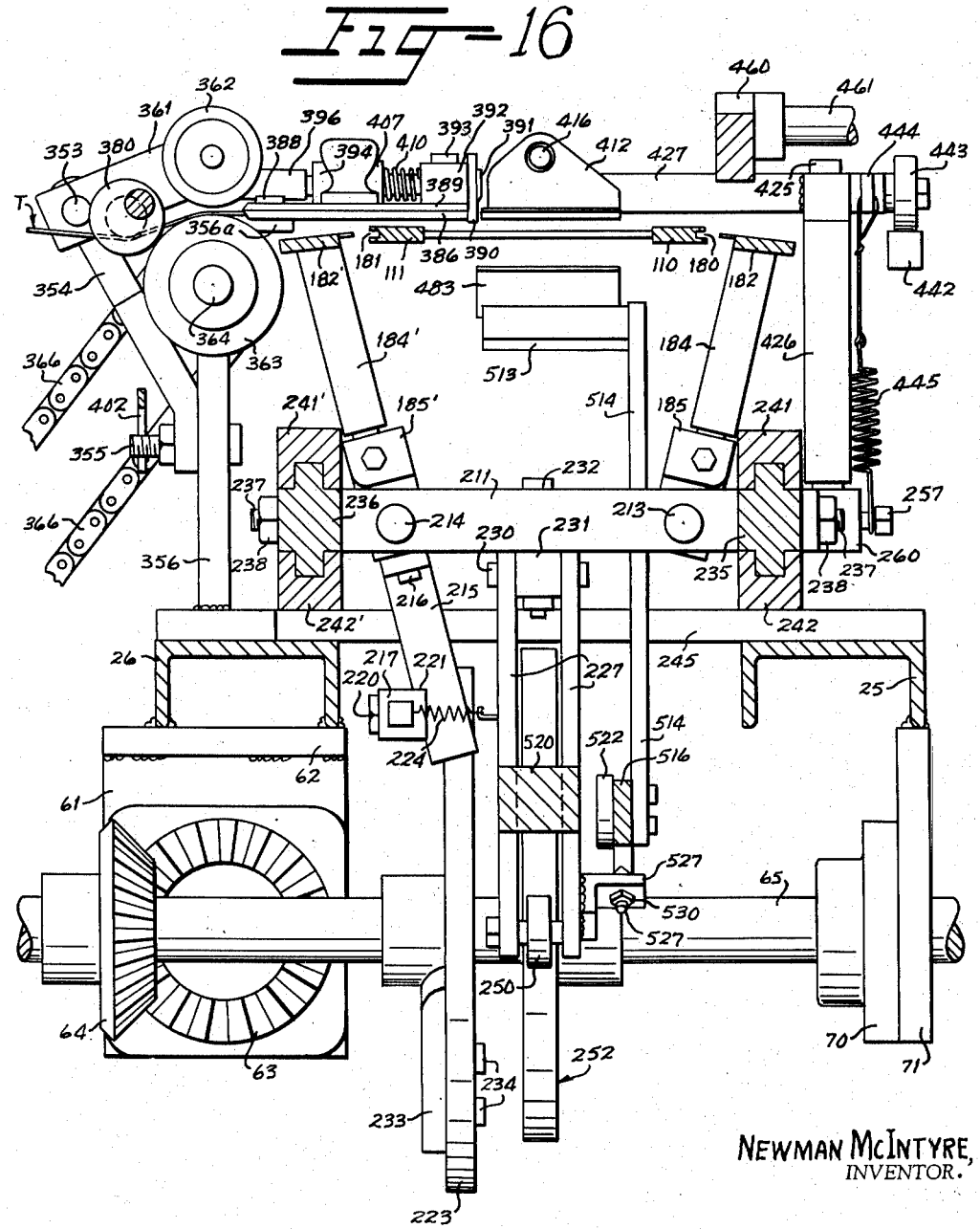

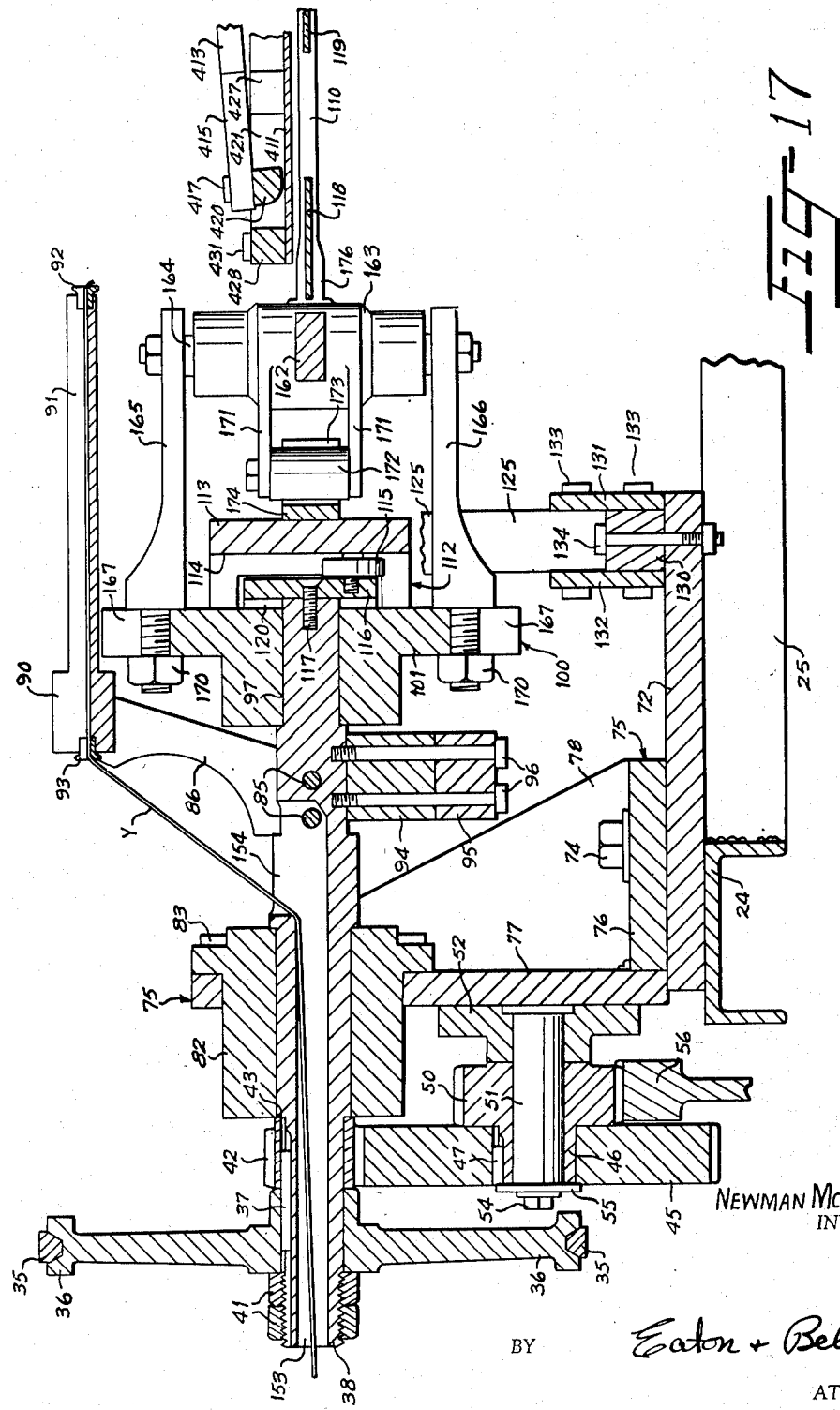

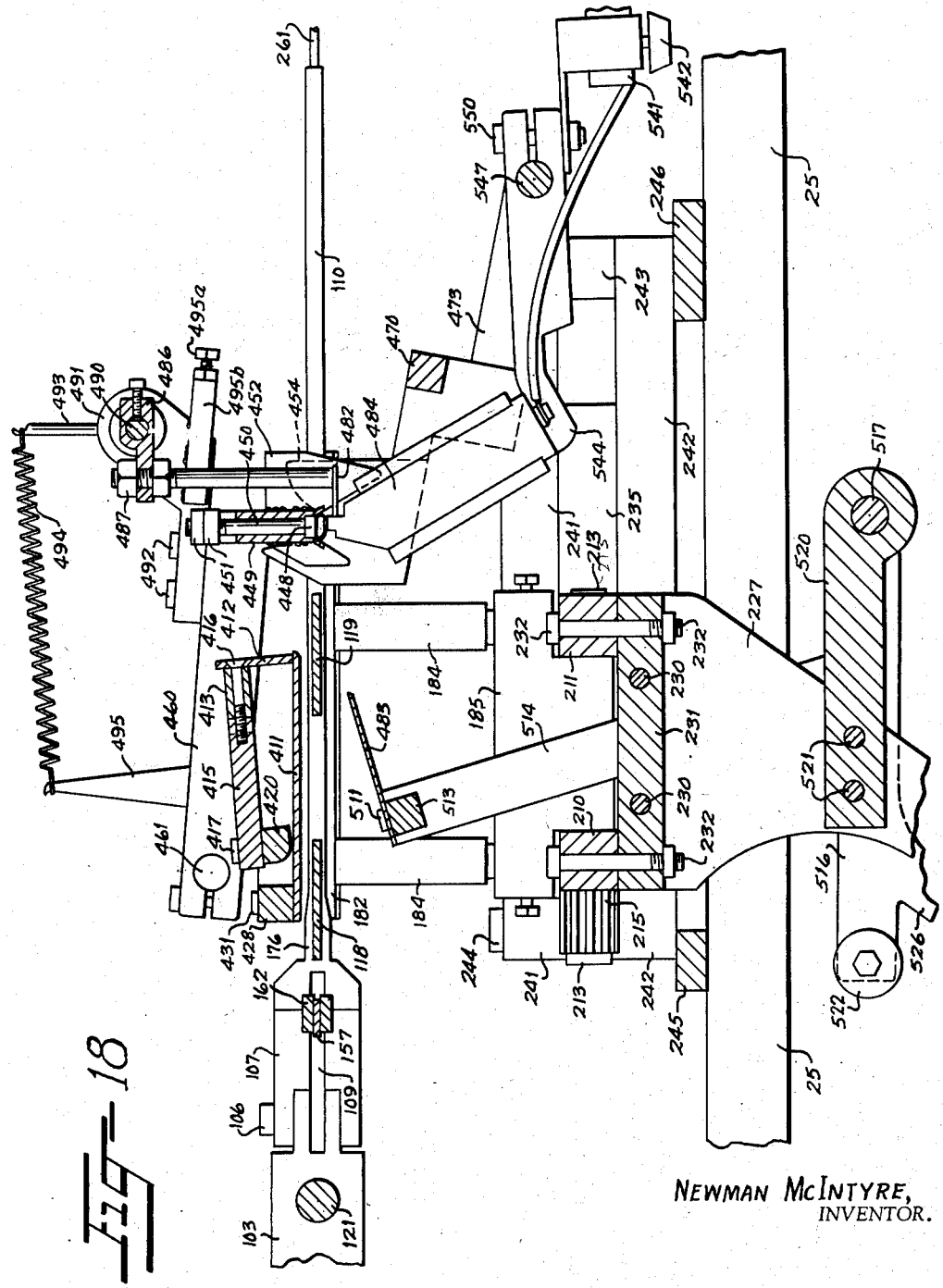

Feb. 3, 1953   N. McINTYRE   2,627,151
SKEIN WINDING AND BANDING MACHINE
Filed July 2, 1951   23 Sheets-Sheet 17

NEWMAN McINTYRE,
INVENTOR.

BY Eaton + Bell
ATTORNEYS.

Feb. 3, 1953 N. MCINTYRE 2,627,151
SKEIN WINDING AND BANDING MACHINE
Filed July 2, 1951 23 Sheets-Sheet 20

NEWMAN MCINTYRE,
INVENTOR.

BY Eaton + Bell

ATTORNEYS.

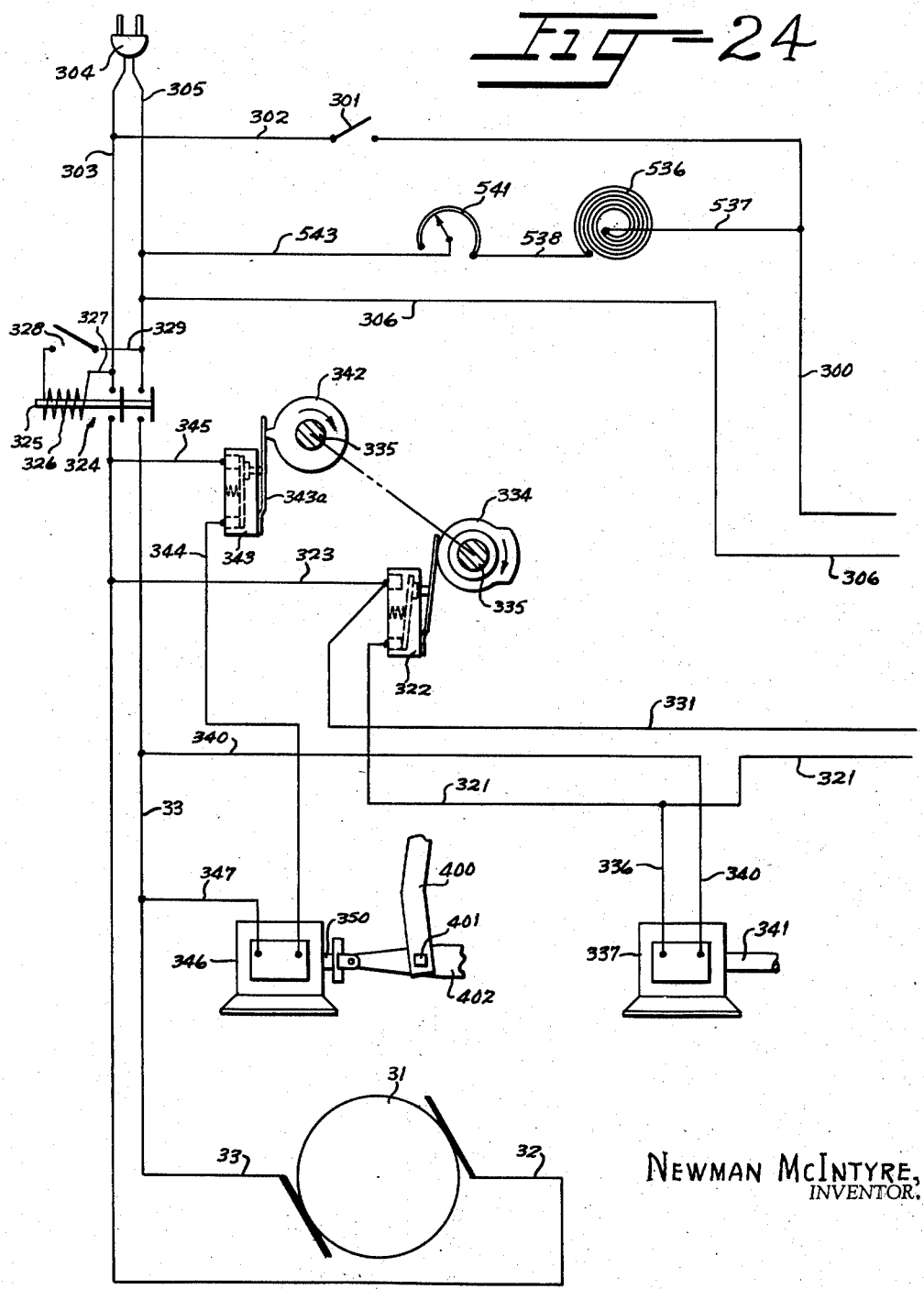

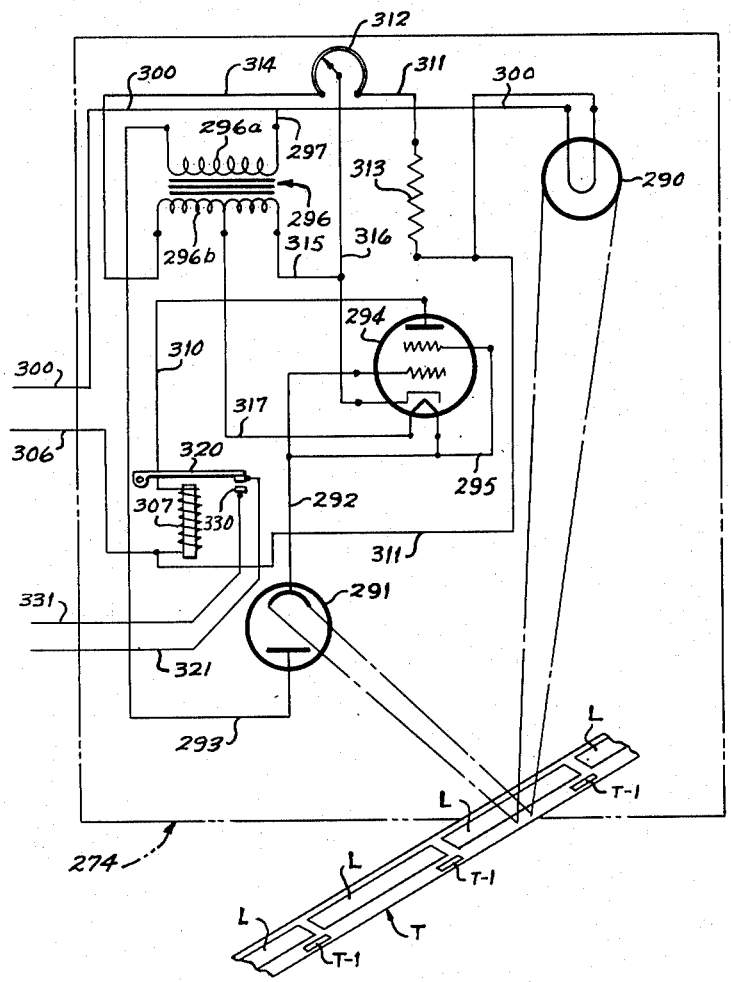
Fig. 24-A

Patented Feb. 3, 1953

2,627,151

UNITED STATES PATENT OFFICE 2,627,151

SKEIN WINDING AND BANDING MACHINE

Newman McIntyre, Shelby, N. C., assignor to Lily Mills Company, Shelby, N. C., a corporation of North Carolina Application July 2, 1951, Serial No. 234,867

16 Claims. (Cl. 53—25)

This invention relates to machines for winding strands and more especially to an improved skein winding machine for forming skeins of yarn, thread and the like and wherein the skeins thus formed are provided with a label wrapped about a medial portion of each skein.

It is the primary object of the invention to provide an improved skein winding machine which may be easily and economically constructed, which is also constructed from a minimum of parts thus facilitating economy of operation and maintenance and which machine may also be operated at relatively high speeds.

It is another object of this invention to provide an improved skein winding machine of the type described wherein a flyer directs yarn to and around a pair of transversely spaced elongated rails or bars comprising a skein holder or frame. Novel means are provided for supporting the skein holder or frame whereby the skein holder or frame is supported at one end thereof only, this being the end at which the flyer is rotatably mounted and the flyer is provided with a thread guide which moves in a circular path about the skein holder and, in so doing, this flyer alternately moves past opposed sides of the frame or skein holder and between said frame or skein holder and the supporting means therefor. Thus, there is provided a novel means for supporting the skein holder or frame which is movable in such a manner as to insure that the supporting means will not interrupt the circular movement of the thread guide associated with the flyer.

It is another object of this invention to provide a skein winding machine of the type described with improved means for progressively moving the skeins of yarn along the bars including a pair of skein transfer bars or members which are normally spaced from the remote surfaces of the skein holder bars and which are provided with longitudinally spaced projections on their proximate surfaces. Upon a desired number of convolutions of yarn being wound about the bars, the skein transfer members move inwardly toward each other and the projections thereon engage the corresponding skein of yarn after which the skein transfer members move forwardly to advance the corresponding skeins a predetermined distance. The skein transfer members then move outwardly out of engagement with the skeins of yarn and return to their original positions.

The skein transfer members are also provided with means for separating the intervening strand of yarn which extends between spaced skeins on said bars while simultaneously bunching all of the convolutions of the yarn on each skein together and positioning a label around a medial portion of the corresponding skein. As the skein having a label thereon is subsequently advanced another step, one of the skein transfer members is provided with a cutting member thereon which severs the previously separated strand extending between adjacent skeins, which strand was separated so as to be properly engaged by the severing means. The skeins are then advanced in such a manner that subsequent skeins will engage skeins in advance thereof and will thereby move the advanced skeins along said bars from which they are subsequently removed by an operator for packing purposes.

Some of the objects of the invention having been stated, other objects will appear as the description proceeds when taken in connection with the accompanying drawings, in which—

Figure 8 is an isometric view showing only the framework of the machine with parts broken away and looking at the upper left-hand corner of Figure 2;

Figure 9 is a traverse vertical sectional view taken substantially along the line 9—9 in Figure 6 and showing the manner in which the skein holder is supported;

Figure 10 is an isometric view of the structure shown in Figure 9;

Figure 11 is an enlarged vertical sectional view taken substantially along the line 11—11 in Figure 2;

Figure 12 is an enlarged vertical sectional view taken substantially along the line 12—12 in Figure 11;

Figure 13 is a vertical sectional view taken substantially along the line 13—13 in Figure 12;

Figure 14 is a horizontal sectional view taken substantially along the line 14—14 in Figure 13;

Figure 15 is a vertical sectional view similar to Figure 13 but showing some of the parts in different positions and being taken substantially along the line 15—15 in Figure 12;

Figure 16 is an enlarged vertical sectional view taken substantially along the line 16—16 in Figure 11;

Figure 17 is an enlarged longitudinal vertical sectional view taken substantially along the line 17—17 in Figure 2 showing the flyer in a different position;

Figure 18 is an enlarged longitudinal vertical sectional view taken substantially along the line 18—18 in Figure 6;

Figure 1:
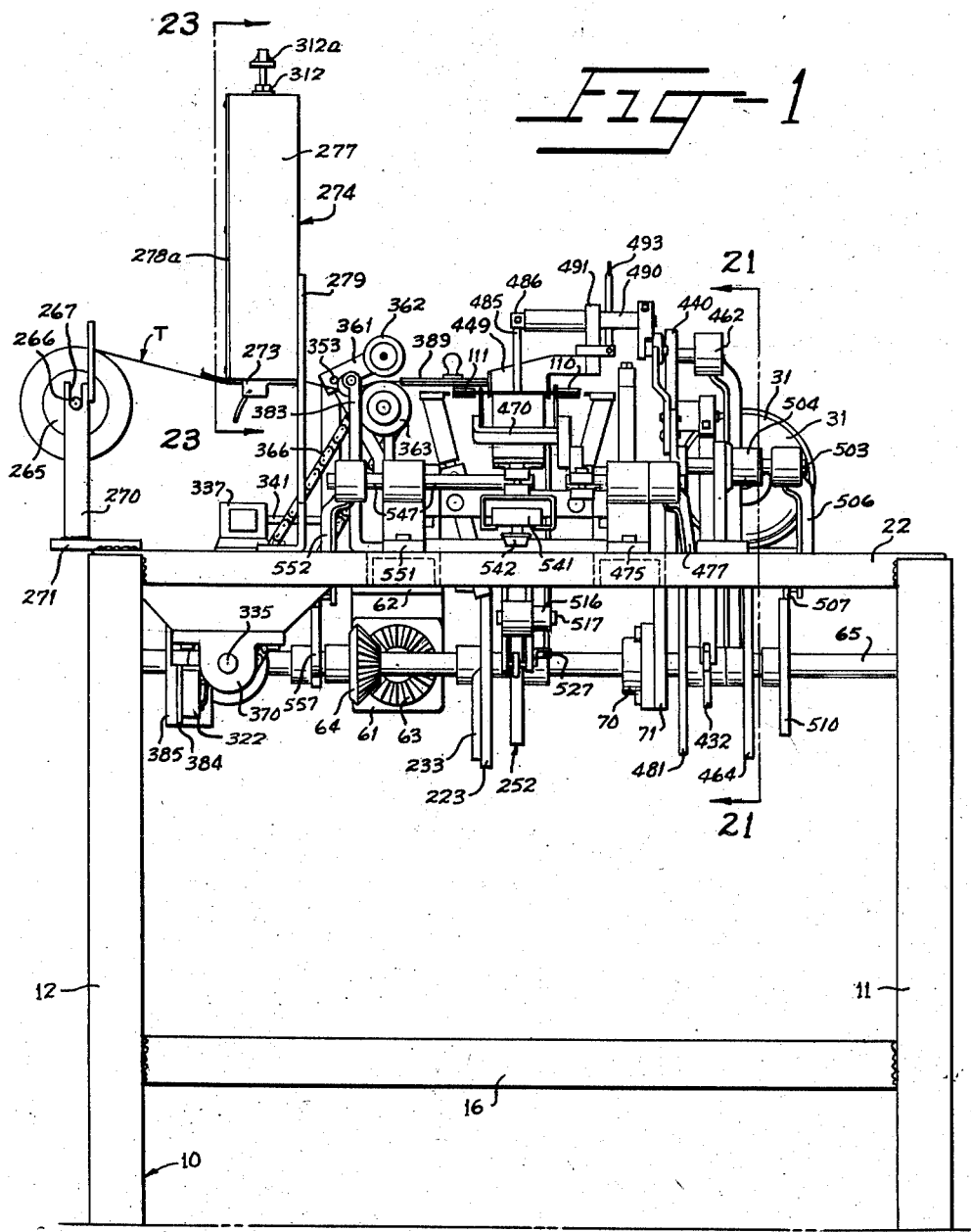
Figure 1 is a front elevation of the improved skein winding machine.

Figures 24 and 24-A illustrate an arrangement of the electrical conductors and other parts associated with the skein winder all of which are shown schematically.

Referring more specifically to the drawings, the numeral 10 broadly designates the framework of the improved skein winding machine (Figures 7 and 8) comprising legs 11, 12, 13, and 14 which are joined together near their lower ends by horizontal supporting members 15, 16, 17 and 18. The upper ends of the legs 11, 12, 13 and 14 are fixedly secured by any suitable means such as welding, to a plurality of horizontally disposed frame members 21, 22, 23 and 24. Opposed front and rear ends of intermediate frame members 25 and 26 are suitably secured, as by welding, to the proximate surface of the front and rear frame members 22 and 24. Fixedly secured to and bridging the distance between the horizontally disposed side frame member 21 and the intermediate frame member 25 is a relatively short transverse frame member 27.

Figure 2:
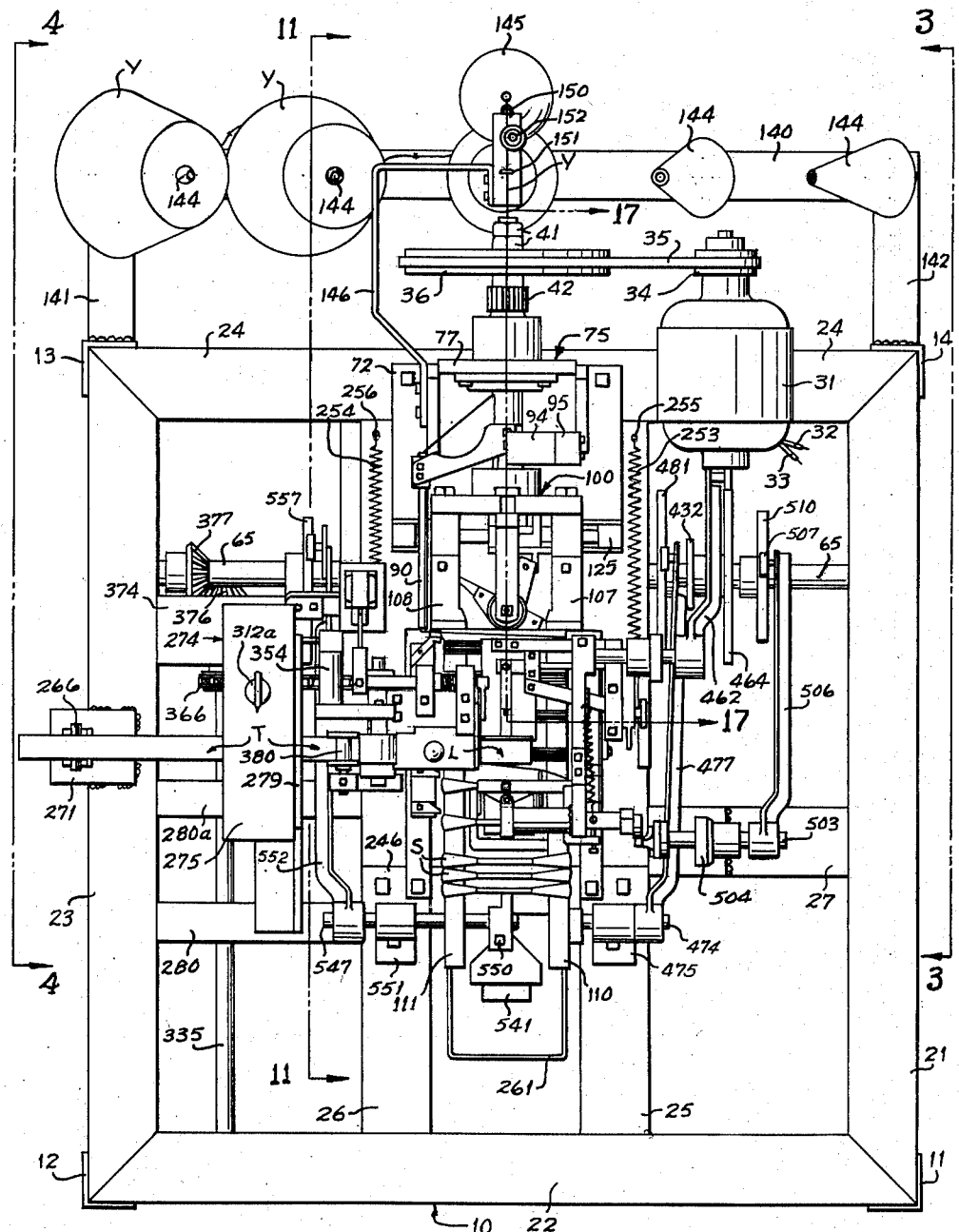
Figure 2 is a top plan view of the improved skein winding machine.
Figure 3:
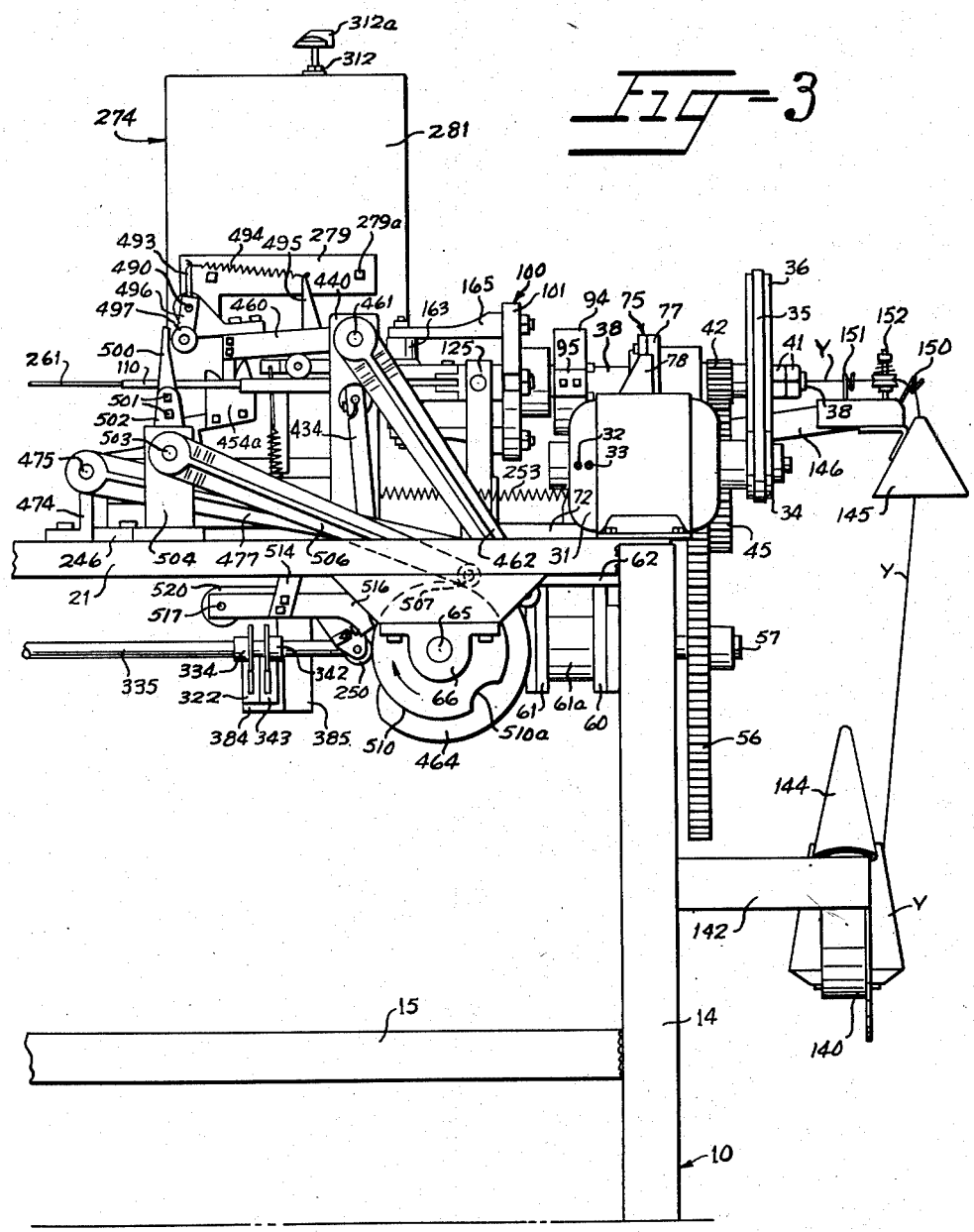
Figure 3 is an elevation of the right-hand side of the machine with parts broken away and being taken looking substantially along the line 3—3 in Figure 2.
Figure 5:
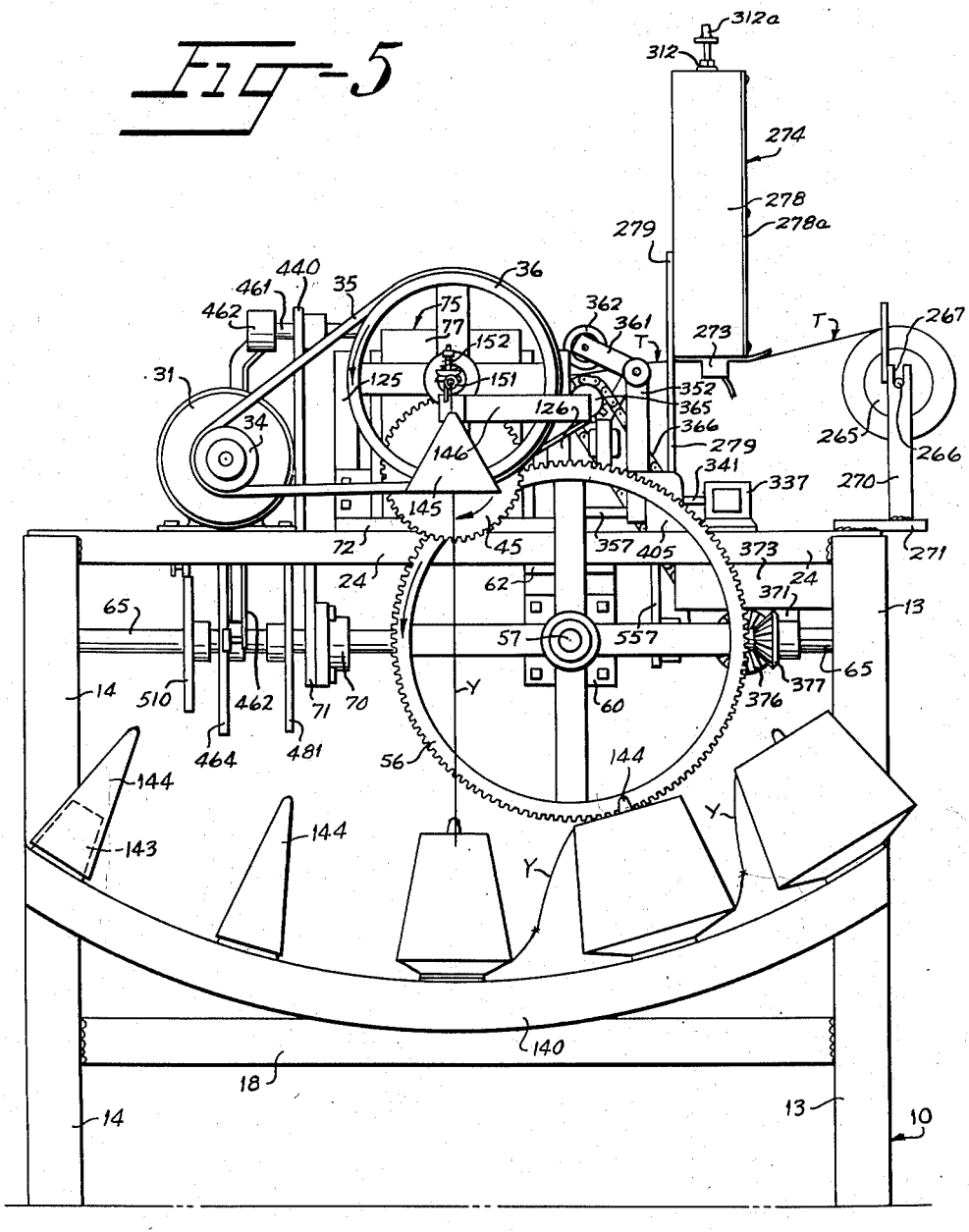
Figure 5 is a rear elevation of the improved skein winding machine.

Referring to Figures 2, 3, and 5, there will be observed an electric motor 31 suitably secured to the rear frame member 24 and having wires 32 and 33 leading therefrom which form a part of a wiring diagram to be later described. The electric motor 31 has fixedly mounted on its shaft a V-pulley 34 which drives a V-belt 35 which, in turn, drives a larger V-pulley 36 fixedly mounted, as by a key 37, on a flyer support shaft 38 (Figure 17). The V-pulley 36 is prevented from having endwise movement on the shaft 38 by a pair of lock nuts 41 being tightened against the outside of the V-pulley 36 and the inside of the pulley 36 bears against a pinion 42.

The right-hand end of the pinion 42, in Figure 17, bears against a shoulder portion 43 on the shaft 38. The pinion 42 meshes with a spur gear 45 which is fixedly mounted, by any suitable means such as by a key 47, on an extended hub portion 46 of a smaller spur gear 50 rotatably mounted on a stub shaft 51. This stub shaft 51 is fixedly mounted in a bearing block 52 which is suitably secured on a vertically disposed bearing support bracket which will be later described in detail.

The spur gears 45 and 50 are prevented from having endwise movement on the stub shaft 51 by a screw 54 and a washer 55 on the left-hand end (Figure 17) of the stub shaft 51 and endwise movement in the other direction is prevented by the bearing block 52. By referring to Figures 5 and 17, it will be observed that the spur gear 50 engages and drives a large spur gear 56 fixedly mounted on one end of a horizontally disposed drive shaft 57. It will be observed in Figures 8 and 11 that the horizontally disposed shaft 57 is rotatably mounted intermediate its ends in a pair of bearing blocks 60 and 61 which are fixedly secured to and extend downwardly from a horizontally disposed plate member 62 which is secured to the intermediate frame member 26 by any suitable means such as welding. These blocks 60 and 61 are bridged by a tubular bearing member 61a.

The horizontally disposed shaft 57 extends to the right in Figure 11 and has fixedly mounted on its right-hand end a beveled gear 63 which meshes with a beveled gear 64 fixedly mounted on a transversely extending cam shaft 65. The opposed ends of this cam shaft 65 are rotatably mounted in bearing blocks 66 and 67 suitably secured to and depending from the lower surfaces of the respective side frame members 21 and 23 (Figures 3, 4, 7, and 8).

Figure 7:
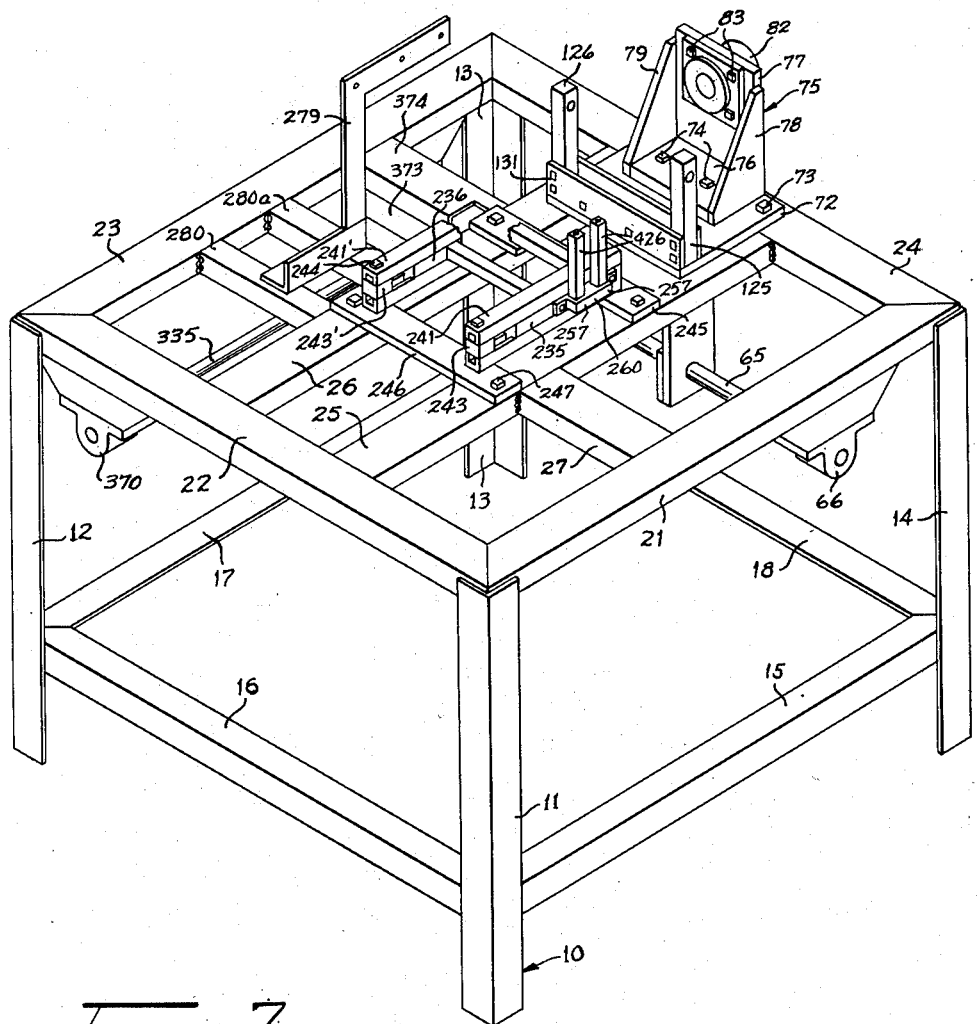
Figure 7 is an isometric view looking at the lower right-hand corner of Figure 2 but showing only the framework of the improved machine.

The cam shaft 65 is also rotatably mounted intermediate its ends in a bearing block 70 (Figure 12) which is suitably secured on a vertically disposed plate 71, the upper end of which is suitably secured, by any suitable means such as welding, to the horizontally disposed intermediate frame member 25. Spanning the horizontally disposed frame members 25 and 26, at the rear ends thereof, is a horizontally disposed bed plate 72 suitably secured to the upper surfaces thereof as by screws 73 (Figure 7).

Secured on this horizontally disposed plate 72, by any suitable means such as screws 74, is a vertically disposed bearing support bracket broadly designated at 75 and comprising a base plate 76, a vertically disposed plate 77 and a pair of gusset members 78 and 79. The vertically disposed plate 77 of the bearing support bracket 75 supports a bearing member 82 in which the hollow shaft 38 is rotatably mounted. The bearing member 82 is secured on the vertically disposed support plate 77 by any suitable means such as screws 83. The bearing block 52 is secured to the plate 77 of the bracket 75 (Figure 17).

Figure 6:
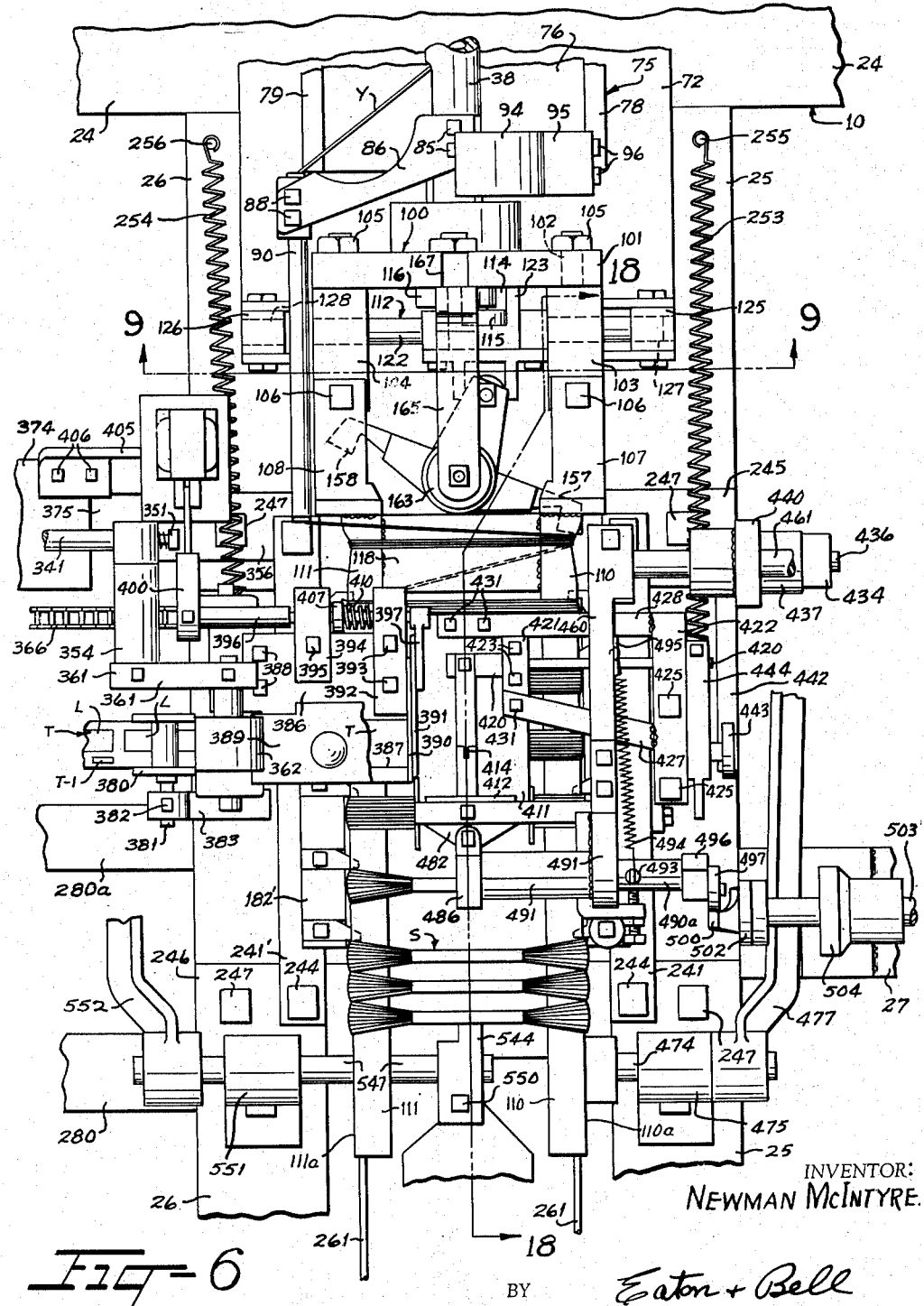
Figure 6 is an enlarged fragmentary plan view of the central portion of Figure 2 showing various parts in different positions.

Referring to Figures 11 and 17, the flyer support shaft 38 is flattened on opposed sides thereof and has suitably secured on these flattened portions, as by screws 85, a pair of radially extending flyer support plates 86 and 87. The outer ends of these flyer support plates 86 and 87 have suitably secured therebetween, as by screws 88 (Figures 6 and 11), a flyer 90 which extends forwardly and has a groove 91 therein along which a strand of yarn or thread Y moves in the forming of skeins in a manner to be later described. Opposed ends of this groove 91 have suitably secured therein, as by a pressed fit, a pair of yarn guiding eyes 92 and 93 which are preferably U-shaped in cross-section in order to facilitate threading the yarn through the flyer 90. Referring to Figures 6 and 17, there will be observed a pair of counter-balancing members 94 and 95 which are secured, by any suitable means such as screws 96, to the side of the flyer support shaft 38 opposite the flyer 90.

The flyer support shaft 38 has a reduced front end portion 97 which carries a skein holder assembly or frame, broadly designated at 100. This skein holder 100 comprises a disk-shaped support member 101 within which thhe portion 97 is rotatably mounted and which has diametrically opposed notches 102 therein in which reduced portions of a pair of forwardly extending skein holder bar support arms 103 and 104 are secured by nuts 105 (Figures 6 and 10). The front ends of the arms 103 and 104 have secured thereon, as by screws 106, respective forwardly extending skein holder bar extensions 107 and 108 which are slotted horizontally at 109 (Figures 15 and 18) for purposes to be later described.

Suitably secured, as by welding, to the front ends of these extensions 107 and 108 are respective forwardly extending skein holder bars 110 and 111 about which the yarn Y is wound in forming skeins in a manner to be later described. These bars 110 and 111 are spanned by horizontally disposed reinforcing plates 118 and 119 (Figure 18) which are suitably secured thereto, as by welding, to lend rigidity to the bars 110 and 111.

In order to prevent rotation of the skein holder assembly 100 as rotation is imparted to the flyer support shaft 38, there is provided a reciprocating skein holder locking device or reciprocable member designated broadly at 112 (Figures 6, 9, 10, and 17) and which is one of the outstanding features of the present invention. This device 112 is preferably of cast construction and comprises a vertically disposed substantially channel-shaped member 113, the flanges of which face rearwardly or towards the disk-shaped support member 101. These flanges define a groove 114 in the member 113 in which a roller or follower 115 has longitudinal reciprocating movement.

This roller 115 is suitably mounted for rotation on a relatively small disk 116 which is suitably secured to the front end of the flyer support shaft 38 by any suitable means such as a screw 117 (Figure 17). The disk 116 also has a groove 120 in the rear surface thereof which is adapted to match the corresponding flattened end of the flyer support shaft 38 to thereby prevent relative movement between the disk 116 and the shaft 38. It is evident that the disk 116 may be supplemented by a crank arm and the roller 115 is positioned eccentrically of the axis of the shaft 38.

It is thus seen that, upon rotation of the disk 116, the roller 115 revolves about the axis of the shaft 38 and, in so doing, will reciprocate vertically in the channel-shaped member 113 to thereby cause the channel-shaped member to reciprocate transversely of the axis of the shaft 38. The channel-shaped member 113 has shaft portions 121 and 122 on opposed sides thereof and, in order to prevent rotation of the channel-shaped member 113 about the axis of the shaft portions 121 and 122, the flanges of the channel-shaped member 113 are provided with rearwardly extending projections 123 at the upper and lower ends thereof, which projections bear against and slidably engage the front face of the disk 101 (Figures 9, 10 and 17). These projections 123 are also provided so the channel-shaped member 113 may reciprocate past the relatively small disk 116, in which instance the upper and lower projections 123 on the channel-shaped member 113 move astride the upper and lower surfaces of the disk 116.

It will be observed in Figures 9 and 10 that the shaft portions 121 and 122, integral with the channel-shaped member 113, slidably penetrate the forwardly extending skein holder bar support arms 103 and 104, respectively. Disposed adjacent the outer surfaces of the forwardly extending skein holder bar support arms 103 and 104 are the upper ends of respective upstanding guide members 125 and 126 which are provided with respective horizontally extending bores 127 and 128 disposed in alinement with the outer ends of the corresponding shaft portions 121 and 122 of the reciprocating skein bar locking device 112.

As reciprocatory movement is imparted to the shaft portions 121 and 122 of the reciprocating skein bar locking device 112, these shaft portions 121 and 122 are alternately caused to enter the corresponding bores 127 and 128 in the upper ends of the upstanding guide members 125 and 126. These upstanding guide members 125 and 126 are spaced from the remote surfaces of the forwardly extending skein holder bar support arms 103 and 104 in relation to the length of each of the shaft portions 121 and 122 of the reciprocating skein bar locking device 112 in order that the outer end of the shaft 121, for example, will not move out of engagement with the bore 127 in the upstanding guide member 125 until the outer end of the shaft 122 has moved into engagement with the bore 128 in the upstanding guide member 126.

However, the lengths of the shaft portions 121 and 122 relative to the radius of the arc of travel of the flyer 90 are such that the particular shaft portion 121 or 122 which may be in withdrawn position is disposed inwardly of the path of travel of the flyer 90 as the flyer moves past the same in directing yarn to the skein holder bars 110 and 111.

It is thus seen that the shaft portions 121 and 122 of the reciprocating skein bar locking device 112 reciprocate in timed relation to rotation of the flyer 90 to insure that the skein holder assembly or frame 100, of which the disk 101 is a part, is amply supported and prevented from rotating as rotation is imparted to the shaft 38, although the flyer 90 rotates continuously about the disk 101.

It will be observed in Figures 7 and 9 that the upstanding guide members 125 and 126 extend downwardly and are bridged by a transverse base member 130 which is secured thereto by means of a pair of plates 131 and 132 (Figure 17) suitably secured to the upstanding members 125 and 126 and the bar 130, as by bolts 133. The plates 131 and 132 are secured against the respective front and rear surfaces of the members 125, 126 and 130. The framework formed from these members 125, 126 and 130 is secured to the upper surface of the bed plate 72 by any suitable means such as bolts 134 (Figures 10 and 17).

Referring to Figures 2 to 5, inclusive, there is shown a curved creel bar 140 which extends transversely of the frame 10 and is suitably secured, as by welding, at opposed ends thereof to forwardly extending frame members 141 and 142 which are suitably secured, as by welding, at their front ends, to the medial portions of the respective legs 13 and 14. The creel bar 140 has a plurality of spaced cone or bobbin supports 143 on each of which a cone 144 is supported, each of the cones 144 having yarn wound thereon.

It is preferable that the corresponding trailing and leading ends of the yarn from successive cones 144 be tied together so the yarn Y may be withdrawn from the cones 144 successively (Figure 5). It will be observed in Figures 5 and 11 that the yarn Y extends upwardly from the corresponding cone 144 and passes through a trumpet-like yarn guide 145 which is suitably secured to a yarn guide holder 146. This yarn guide holder 146 extends forwardly and is suitably secured as by screws 147 (Figure 11), to the gusset member 79 of the vertically disposed bearing support bracket 75.

The rear portion of this yarn guide holder 146 has projecting upwardly therefrom a pair of spaced yarn guides 150 and 151, between which a suitable disk-type tension device designated generally at 152 is disposed, this tension device 152 being suitably secured to the rear portion of the yarn guide holder 146. Thus, the yarn Y extends upwardly through the trumpet-like yarn guide, through the yarn guide 150, the tension device 152 and the yarn guide 151 successively.

Now, referring to Figure 17, it will be observed that the flyer support shaft 38 is provided with an axially alined passageway 153 which extends from the rear end thereof and terminates intermediate the ends of the shaft 38. The shaft 38 is also provided with an opening 154 in the surface thereof adjacent the flyer 90 which opening 154 communicates with the passageway 153. Thus, the yarn Y extends from the guide 151, in Figure 11, through the passageway 153 and the opening 154 in Figure 17 and then extends outwardly and passes through the substantially U-shaped yarn guiding eye 93, along the groove 91 in the flyer 90 and through the yarn guiding eye 92 successively.

Figure 19:
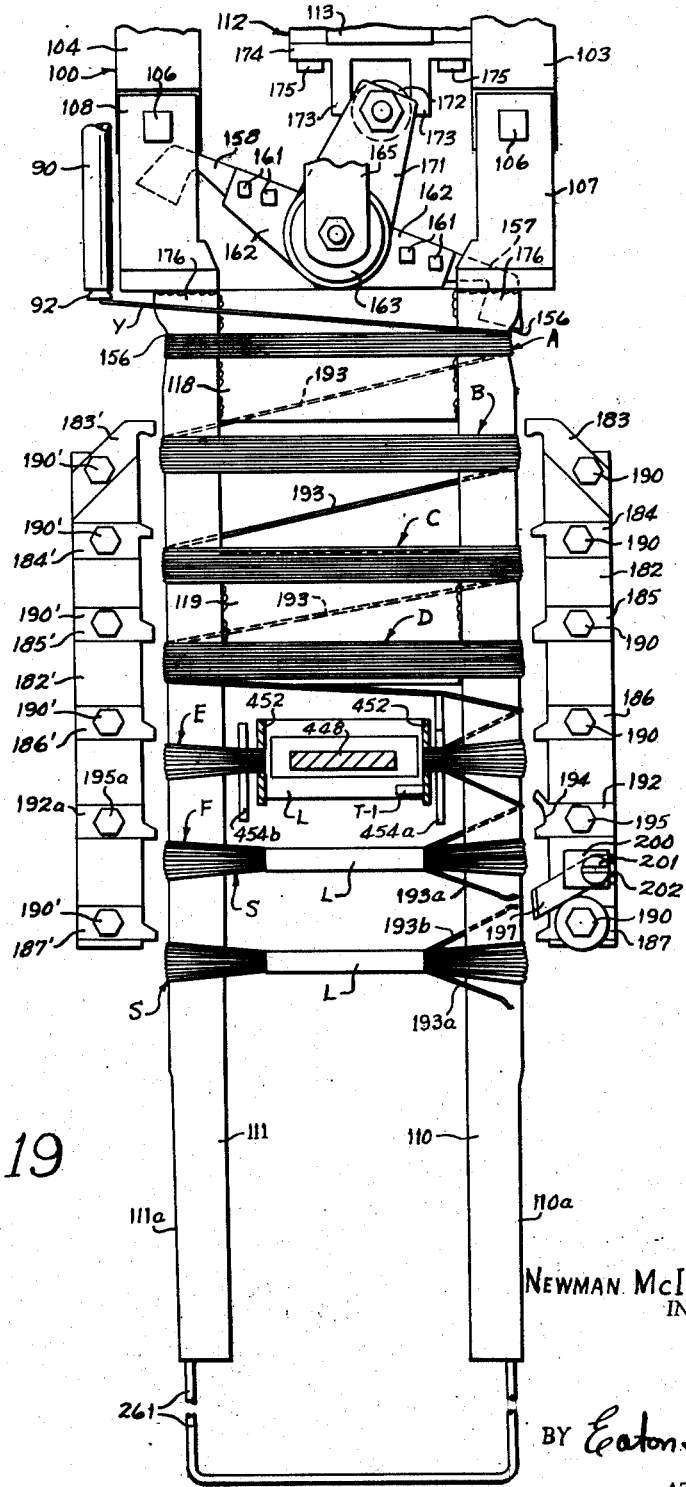
Figure 19 is an enlarged diagrammatic plan view of the central portion of Figure 2 and showing the various steps in winding skeins and applying labels thereto.
Figure 20:
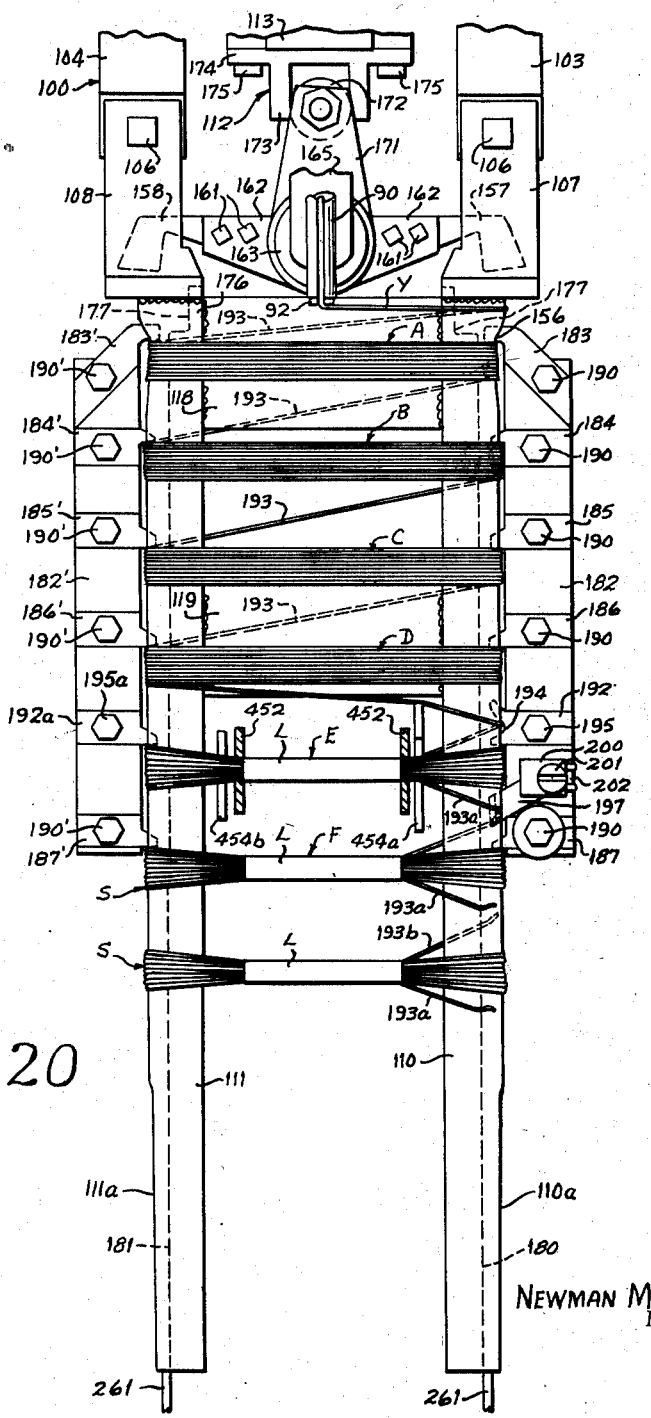
Figure 20 is a view similar to Figure 19 but showing some of the parts in different positions.

Referring to Figures 19 and 20, it will be observed that the skein holder bars 110 and 111 are made of relatively thin material, the flat sides of which face upwardly and downwardly and the edges of which face inwardly and outwardly. The outer edges of the skein holder bars 110 and 111 are each provided with a slight recess 156 therein and then the remote edges of the bars 110 and 111 flare outwardly slightly after which the remote edges of the skein holder bars 110 and 111 gradually converge toward the front of the machine. The yarn Y is directed to these skein holder bars 110 and 111 from the eye 92 of the flyer 90 at a point immediately adjacent the respective extensions 107 and 108 and immediately in advance of the recesses 156 in the outer surfaces of the skein holder bars 110 and 111 (Figures 6 and 17). The yarn is initially guided to the skein holder bars 110 and 111 by the hand of the operator and held by the operator's hand until several rounds of the yarn have been wound on the bars.

Each convolution of yarn wound about the skein holder bars 110 and 111 is then moved forwardly into the corresponding recess 156, by means to be presently described, so as to partially relieve the tension in each convolution wrapped around the skein holder bar. Each convolution of yarn wound about the skein holder bars 110 and 111 is in substantially the shape of an elongated rectangle or an elongated ellipse with the convolutions being formed spirally with respect to each other.

In order to insure that each convolution of the yarn does not overlap those convolutions which have previously been wound about the skein holder bars 110 and 111, a pair of coil displacing reciprocating arms 157 and 158 are provided (Figures 19 and 20) which are adapted to move adjacent the respective skein holder bars 110 and 111. These reciprocating arms 157 and 158 alternately engage the ends of each coil of yarn and slide it forwardly on the skein holder bars 110 and 111 and in timed relation to the rotation of the flyer 90 so that, for example, when the flyer 90 is moving past the skein holder bar 110, the reciprocating arm 158 is moving forwardly to engage the corresponding end of the coil of yarn previously deposited on the corresponding bar 111 to move this portion of the yarn forwardly against the convolutions of yarn previously deposited thereon and into the corresponding recess 156 in the skein holder bar 111. These reciprocating arms 157 and 158 work in the slots 109 in the respective skein holder bar extensions 107 and 108.

The reciprocating arms 157 and 158 are substantially L-shaped and extend inwardly toward each other and are suitably secured, as by screws 161, to radially projecting portions 162 of a trunnion 163. This trunnion 163 is oscillatably mounted on a vertically disposed shaft 164, the threaded reduced upper and lower ends of which slidably penetrate a pair of corresponding trunnion support arms 165 and 166 (Figures 4, 9, 10 and 17), and have nuts on opposed ends thereof.

It will be observed in Figures 9, 10 and 17 that the disk-shaped support member 101 is provided with a pair of diametrically opposed notches 167 in which reduced threaded rear end portions of the trunnion support arms 165 and 166 are slidably mounted and which are secured therein by suitable nuts 170 to thereby secure the trunnion support arms 165 and 166 to the disk-shaped support member 101.

Referring to Figure 17, it will be observed that the trunnion is provided with a pair of vertically spaced radially extending arms 171 between which a follower 172 is mounted, this follower being shown in the form of a roller which is, in turn, straddled by a yoke member comprising a pair of horizontally spaced projections 173 (Figures 9, 10 and 17) extending forwardly from a bracket 174 which is suitably secured, as by screws 175, to the front surface of the channel-shaped member 113 of the reciprocating skein bar locking device 112.

It is thus seen that, upon the shaft portion 121 of the reciprocating skein bar locking device 112 moving from left to right into engagement with the bore 127 in the upstanding material 125 in Figures 9 and 10, the bracket 174 also moves therewith to assume substantially the position shown in Figure 19. Therefore, the trunnion 163 is moved simultaneously with the reciprocating skein bar locking device 112 in a clockwise direction from, say, the position shown in Figure 20 to that shown in Figure 19, to thereby cause the reciprocating arms 157 and 158 to move in a like manner.

Thus, the arm 157 will move forwardly while the arm 158 moves rearwardly and the front end of the arm 157 will engage the corresponding portion of the yarn Y previously admitted to the skein holder bar 110 to move the same forwardly in the corresponding recess 156. As is clearly shown in Figure 19, this latter operation occurs at the time that the flyer 90 is directing the yarn past the outer surface of the skein holder bar 111.

It is evident that the reciprocating arms 157 and 158 move in the opposite direction from that described upon the flyer 90 moving past the skein holder bar 110 and as the shaft portion 122 of the reciprocating skein bar locking device 112 (Figure 9) moves into the bore 128 in the upstanding guide member 126 and as the other shaft portion 121 of the reciprocating skein bar locking device 112 moves out of the bore 127 in the upstanding guide member 125.

After a predetermined number of convolutions or coils of yarn have been wound about and positioned in the recesses 156 of the bars 110 and 111, as shown in Figure 19, means are provided for engaging the skein of yarn thus formed and advancing the same a predetermined distance along the bars 110 and 111.

In so doing, previous groups of coils of yarn which may have been wound about the skein holder bars 110 and 111 are also advanced forwardly along the skein holder bars 110 and 111 in precise spaced relation to each other to thus position these groups of convolutions or coils of yarn at predetermined points for subsequent operations.

For purposes of description, the stations at which the various groups of convolutions of yarn shown in Figures 19 and 20 are disposed shall be indicated successively at A, B, C, D, E and F and the completed skeins of yarn shall all be indicated at S.

It will be noted in Figures 15 and 18 that the portions of the skein holder bars 110 and 111 between the extensions 107 and 108 and the corresponding recesses 156 are of greater thickness than the remaining portions of the corresponding skein holder bars 110 and 111. This thickened portion on each of the bars 110 and 111 is indicated at 176 and is provided, not only for the purpose of relieving tension in the convolutions of yarn wound thereabout as they are subsequently advanced, but also provides for a corresponding groove 177 in each of the bars 110 and 111 in which the reciprocating arms 157 and 158 move as they move forwardly beyond the grooves 109 in the extensions 107 and 108 in moving the convolutions of yarn off of the thickened portions 176 and into the recesses 156.

It will be observed in Figures 12, 16, 19 and 20 that the outer or remote edges of the skein holder bars 110 and 111 are provided with respective longitudinally extending grooves 180 and 181 which communicate with the corresponding grooves 177 in the bars 110 and 111. In order to move the skeins along the skein holder bars 110 and 111 following the winding of a predetermined number of coils or convolutions about the bars 110 and 111 and positioning the same in the recesses 156, there is provided a pair of skein transfer bars 182 and 182' which are normally spaced adjacent the outer surfaces of the respective skein holder bars 110 and 111. These skein transfer bars 182 and 182' are movable simultaneously longitudinally of the respective skein holder bars 110 and 111 in opposite directions and also move inwardly with respect to each other and then move outwardly in a manner to be presently described.

The skein transfer bars are provided with a plurality of inwardly projecting skein transfer tines or skein engaging prongs 183 to 187, inclusive and 183' to 187', inclusive, respectively (Figures 6, 19 and 20), which are spaced predetermined distances apart from each other on the respective skein transfer bars 182 and 182'. These skein engaging prongs 183 to 187 and 183' to 187' may be integral with the respective skein transfer bars 182 and 182' if so desired. However, they are shown in the drawings as being suitably secured, as by screws 190 and 190' to the respective skein transfer bars 182 and 182'. In order that the upper surfaces of the skein transfer prongs 183 to 187, inclusive, and 183' to 187', inclusive, may be flush with the upper surfaces of the respective skein transfer bars 182 and 182', a suitable groove is provided to accommodate each of the skein transfer prongs or tines 183 to 187 and 183' to 187'.

It will be observed in Figures 19 and 20 that the skein transfer prongs or tines 186 and 187 are spaced a substantially greater distance apart from each other than the remaining prongs thereon, the prongs on the skein transfer bar 182' also being spaced in coinciding relation thereto. The prongs 186 and 187 are spaced so as to provide a space for a strand positioning device or locater 192, there being an intervening strand or strand portion 193 extending between each group of convolutions of yarn as they are advanced along the skein holder bars 110 and 111.

This strand locator 192 extends inwardly and is provided with a curved inner surface defining a notch 194. The strand locator 192 is also secured in a suitable groove in the upper surface of the skein transfer bar 182 by any suitable means such as a screw 195. All of the members 183 to 187 and 192 on the skein transfer bar 182 are positioned in the same horizontal plane so as to be moved into the corresponding groove 180 in the outer edge of the skein holder bar 110. A skein transfer prong 192a is provided between the prongs 186' and 187' for coacting with the locator 192 in moving a finished skein S forwardly beyond the station F. This prong 192a is secured in a groove provided therefor in the bar 182' by a screw 195a.

It is evident that the members 183' to 187' and 192a on the skein transfer bar 182' are also positioned in the same horizontal plane and in such a manner as to enter the corresponding groove 181 in the skein holder bar 111 when the skein transfer bars 182 and 182' are moved inwardly towards each other from the position shown in Figure 19 to the position shown in Figure 20. The skein label wrapping or applying station, indicated at E in Figures 19 and 20, is disposed in a position adjacent the strand locator 192 so the strand locator 192 will cause the intervening strand portion 193 extending between the groups of coils at the adjacent stations D and E to be held in a proper position to which it had been previously moved, by means to be later described, during the wrapping of a label L about the convolutions of yarn disposed at the station E.

This strand locator 192 is particularly provided to insure that the intervening portion of yarn 193 extending between adjacent groups of convolutions of yarn may be retained in its same relative position as the convolutions of yarn are advanced from a point between the stations D and E to a point between the stations E and F as is clearly shown in Figures 19 and 20.

When the convolutions of yarns are advanced from the station E to the station F, the intervening strand portion 193 is severed by means of a cutting blade 197 of relatively thin material and the cutting edge of which is adapted to move into the corresponding groove 180 in the skein holder bar 110 from the position shown in Figure 19 to the position shown in Figure 20. This blade 197 is secured to the upper surface of the skein transfer bar 182 by a clamp plate 200 and a screw 201, the blade being provided with a slot 202 in the outer portion thereof which is penetrated by the screw 201 to thus provide for adjustment of the blade 197. As the intervening strand portion 193 between the groups of coils or convolutions of yarns disposed at the stations E and F is severed, this forms tail portions 193a and 193b which extend from the same end of the finished skein S and which permit the yarn to be withdrawn from within a label L by a user grasping either one of the end portions 193a or 193b of the skein S.

*Control means for skein transfer bars*

The control or driving means for the skein transfer bars is most clearly illustrated in Figures 7, 18, and 12 to 16, inclusive. The skein transfer bars 182 and 182' are suitably secured, as by welding, to the upper surfaces of longitudinally spaced downwardly extending arms 184 and 184' which are preferably rectangular in cross-section and the reduced lower ends of which are secured in opposed ends of respective longitudinally extending blocks 185 and 185' by any suitable means such as screws 186 and 186'. Now, as most clearly illustrated in Figures 13 and 15, it will be observed that there are two of the arms 184 provided, the lower ends of which are disposed closely adjacent opposed ends of the corresponding block 185. The arms 184' are also arranged in an identical manner to that in which the arms 184 are arranged.

It will also be observed in Figures 13 and 15 that the bar 185 extends over a pair of longitudinally spaced transversely extending carriage bars 210 and 211, the proximate surfaces of which are slidably engaged by a downwardly projecting portion 212 integral with the block 185. The block 185' is also provided with a downwardly projecting portion 212' (Figures 12 and 15) which is identical to the portion 212 of the block 135. These downwardly projecting portions 212 and 212' of the blocks 185 and 185' are fixedly mounted on respective shafts 213 and 214 which are oscillatably mounted in the transverse carriage bars 210 and 211.

The rear ends of the shafts 213 and 214 project beyond the corresponding transverse bar 210 and have the outer ends of gear segments 215 and 216, respectively, fixedly mounted thereon. These gear segments 215 and 216 extend inwardly and intermesh as is clearly shown in Figure 12. It is thus seen that, upon movement being imparted to one of the skein transfer bars 182 or 182' about the corresponding shaft 213 or 214, in a manner to be presently described, like movement will also be imparted to the other of the skein transfer bars 182 or 182' causing them both to move inwardly simultaneously or outwardly simultaneously as the case may be. The manner in which the transverse carriage bars 210 and 211 are supported will be presently described.

In order to impart oscillatory movement to the skein transfer bars 182 and 182', it will be observed in Figures 13 and 15 that the lower surface of the downwardly projecting portion 212' of the block 185' has a substantially T-shaped bracket 215 suitably secured thereto, as by screws 216. The lower end of this sumstantially T-shaped bracket 215 (Figures 13, 14 and 16) has the front end of a follower carrying bar 217 suitably secured thereto, as by a screw 220. In order to insure that the follower carrying bar 217 may not rotate about the screw 220, it will be observed in Figure 16 that the T-shaped bracket 215 is provided with a notch 221 therein in which the front end of the follower carrying bar 217 is fitted.

The follower carrying bar 217 extends rearwardly and has a roller or cam follower 222 mounted for rotation in the bifurcated rear end thereof. The cam follower 222 is urged into engagement with the side surface of a cam wheel 223 by a tension spring 224 (Figures 13 and 16), one end of which is suitably connected to the front end of the follower carrying bar 217 and the other end of which is suitably connected to one of a pair of vertically disposed follower carrying brackets 227. These follower carrying brackets 227 extend upwardly and are suitably secured, as by screws 230, to opposed sides of a longitudinally extending bar 231 which is suitably secured at opposed ends thereof to the lower surfaces of and intermediate the ends of the transverse carriage bars 210 and 211, as by bolts 232 (Figures 12 and 16).

Referring again to Figures 12, 13, 14 and 16, it will be observed that the outer surface of the cam wheel 223 has a cam member 233 suitably secured thereto as by screws 234. The cam wheel 223 is fixedly mounted on the cam shaft 65 theretofore described.

It is thus seen that the tension of the spring 224 (Figure 16) normally causes the lower end of the bracket 215 to assume the position substantially as shown in Figure 16. This, of course, causes the prongs on the respective skein transfer bars 182 and 182' to be disposed in a position spaced outwardly of the outer edges of the skein holder bars 110 and 111. However, upon the cam member 233 moving into engagement with the cam follower 222 (Figure 13), the bar 217 causes the T-shaped bracket 215 to move towards the observer in Figure 13 or in a clockwise direction in Figure 16.

It is evident that this will cause the block 185' to move in a clockwise direction in Figure 16 or in a counterclockwise direction in Figure 12 thus causing the skein transfer bars 182 and 182' to move inwardly so the prongs thereon enter the grooves 180 and 181 in the respective skein holder bars 110 and 111 substantially as shown in Figure 20, these skein transfer bars 182 and 182' being mounted to move simultaneously by virtue of the gear segments 215 and 216 shown in Figure 12.

Now, as heretofore stated, the skein transfer bars 182 and 182' must also move rearwardly and forwardly in timed relation to their inward and outward movement and, to this end, the opposed ends of the carriage bars 210 and 211 are suitably secured to laterally spaced longitudinally extending dovetailed carriage side bars 235 and 236 (Figures 12 and 16). In this instance, the opposed ends of each of the transverse carriage bars 210 and 211 are provided with reduced threaded portions 237 which slidably penetrate the corresponding longitudinally extending carriage side bars 235 and 236 and are secured therein by nuts 238.

It will be observed in Figures 7, 12, 15 and 18 that the carriage side bars 235 and 236 are mounted for horizontal sliding movement between substantially channel-shaped carriage guide bars 241 and 242 and 241' and 242', respectively. The front and rear ends of the carriage guide bars 241 and 242 are held in proper vertical spaced relation to each other by blocks 243 and these blocks 243 as well as the carriage guide bars 241 and 242 are slidably penetrated by screws 244 for securing the carriage guide bars 241 and 242 to transverse frame members 245 and 246.

The front and rear ends of the carriage guide bars 241' and 242' are also spaced vertically from each other by blocks 243' which are penetrated and held in position by corresponding screws 244' for securing the carriage guide bars 241' and 242' to the upper surfaces of the transverse frame members 245 and 246. The transverse frame members 245 and 246 are suitably secured to the upper surfaces of the longitudinally extending frame members 25 and 26 by any suitable means such as screws 247.

Now, in order to move the skein transfer bars 182 and 182' longitudinally of the skein holder bars 110 and 111 in timed relation to inward and outward movement of the skein transfer bars 182 and 182', the lower ends of the cam follower brackets 227 have a cam follower 250 mounted for rotation therebetween on a suitable stud 251. The cam follower 250 is normally urged rearwardly into engagement with a cam wheel 252 by any suitable means such as tension springs 253 and 254 (Figure 6), the rear ends of which are connected to upstanding spring perches 255 and 256 disposed adjacent opposed sides of the bed plate 72 and being threadably embedded in the respective longitudinally extending intermediate frame members 25 and 26.

The front end of the tension spring 253 is connected to one of a pair of set screws 257 which are threadably embedded, for purposes to be later described, in a support block 260 (Figure 7 and 12) which is slidably penetrated by corresponding reduced ends of the transverse carriage bars 210 and 211 and secured against the outer surface of the longitudinally extending carriage side bar 235 by the corresponding nut 238. The cam wheel 252 is fixedly mounted on the cam shaft 65 and is provided with a relatively low surface 252a and a relatively high peripheral surface 252b, the latter being interrupted by a recess 252c (Figure 15).

It is thus seen that, assuming the cam wheel 252 to be disposed in the position shown in Figure 15, the cam wheel 252 rotates in a counter-clockwise direction and the tension springs 253 and 254 cause the carriage, including the transverse carriage members 210 and 211 and the carriage side members 235 and 236, to move rearwardly. This causes the skein transfer bars 182 and 182' to move from the position shown in Figure 19 rearwardly to substantially the position in Figure 20 except the prongs on the transfer bars 182 and 182' will be disposed in an outward position relative to the skein holder bars 110 and 111.

The cam wheel 252 continues its rotation in a counter-clockwise direction in Figure 15 until the cam follower 250 is caused to move from left to right or forwardly in Figure 15 as the high surface 252b of the cam wheel 252 moves towards the cam follower 250. However, before the cam follower 250 and the associated parts are caused to move from left to right or forwardly, the cam member 233 on the cam wheel 223 engages the cam follower 222 (Figure 13) thus causing the skein transfer bars 182 and 182' to move inwardly in the manner heretofore described to assume the position shown in Figure 20.

Now, as the cam wheel 252 in Figure 15 continues its rotation, the cam follower 250 is alternately engaged by the high surface 252b thereby causing the cam follower 250 and associated parts to move forwardly and, in so doing, the prongs 183 and 183' on the skein transfer bars 182 and 182', respectively, move forwardly from the A station to the B station while the remaining prongs 184 to 187, the locator 192 and the prongs 184' to 187' and 192a also move forwardly adjacent the corresponding stations to thus move the convolutions or groups of coils of yarn previously admitted to the skein holder bars 110 and 111 forwardly accordingly.

It might be stated that, at the time the prongs 183 and 183' move inwardly to engage the coil of yarn last wound about the skein holder bars 110 and 111, the flyer 90 moves from a position adjacent the outer surface of the skein holder bar 110 to substantially the position shown in Figure 20. As each completed skein S is engaged by the prongs 187 and 187' and advanced forwardly along the bars 110 and 111, any skeins of yarn previously completed are engaged and advanced along the bars 110 and 111 by the skein of yarn rearwardly thereof, this being repeated until a predetermined number of skeins are positioned on the exposed front portions of the skein holder bars 110 and 111.

It will be observed in Figures 19 and 20 that the outer edges of the skein holder bars 110 and 111 adjacent the front ends thereof are recessed slightly, as at 110a and 111a, respectively, in order to again relieve the tension in the coils of yarns forming the skeins S whereby, upon a plurality of skeins being positioned on the portions of the skein holder bars 110 and 111 having recesses 110a and 111a thereon, these last-named skeins of yarns S may be moved forwardly by an operator and onto a substantially U-shaped skein handling member 261 which is shown in Figures 2, 6, 19 and 20 as being formed from spring wire and the legs of which are adapted to be disposed in the grooves 180 and 181 in the respective skein holder bars 110 and 111 as the skeins of yarn are slid off of the front ends of the skein holder bars 110 and 111 onto the skein holding member 261.

The legs of the substantially U-shaped skein holding member 261 are normally biased inwardly towards each other so they will frictionally engage the bottoms of the grooves 180 and 181 in the skein holder bars 110 and 111 for holding the skein holding member 261 in engagement with the skein holder bars as the completed skeins S are slid onto the skein handling member 261. The operator may then slide the skein holding member 261 forwardly to free the same from engagement with the skein holder bars 110 and 111 subsequent to which the skeins on the skein holding member may be slid off of the same into a suitable container.

It is to be understood that a suitable packaging device may be associated with the front ends of the skein holder bars 110 and 111 for packaging the completed skeins S if so desired.

*Bunching and labeling*

The portion 193 of yarn extending between each group of convolutions or coils of yarn at the stations A, B, C, D, E and F is positioned so the yarn extends past the outer edge of the skein holder bar 110 at a point substantially halfway between the adjacent groups of coils or convolutions of yarn disposed at the stations D, E and E, F, and the group of convolutions of yarn at the station E are bunched together intermediate their ends subsequent to which the label 196 is positioned around the corresponding group of convolutions of yarn to form a skein therefrom.

The means for introducing each label L to the machine and positioning the same about the group of convolutions of yarn disposed at the station E will now be described.

Referring to Figures 1, 2, 4, 5, 23 and 24-A, it will be observed that the labels L in Figure 24-A are disposed in end-to-end relation in tape form. The tape is advanced the equivalent of the length of each label L appearing thereon by means of a device controlled by a photoelectric cell and, therefore, it will be observed in Figure 24-A that the tape, indicated generally at T has a plurality of the labels L superimposed thereon.

It will be noted that these labels L are spaced slightly apart from each other, all of the labels being accurately spaced a like distance from each other and the tape T has superimposed thereon a plurality of opaque areas indicated at T-1, there being one of the opaque areas T-1 disposed adjacent the juncture of the proximate ends of each successive label on the tape T. Each of the areas T-1 may be of any desired color or texture so they will not reflect light rays while the areas between the areas T-1 must be such that they will reflect light rays for purposes to be later described.

Referring again to Figure 1, it will be observed that the tape T is fed from a roll 265 which is rotatably mounted on a stub shaft 266 which, in turn, rests in suitable notches 267 provided in the upper ends of forwardly and rearwardly spaced reel standards 270. These standards 270 extend downwardly and are suitably secured, as by welding, to the upper surface of a plate 271 which is suitably secured, as by welding, to the upper surface of the side frame member 23 of the framework 10 (Figure 2).

The tape T then extends inwardly and is threaded through a suitable guide 273 which is suitably secured to the lower surface of a housing broadly designated at 274 and which houses a tape feed control unit to be presently described. This housing 274 comprises top, bottom, front and rear walls 275 to 278, inclusive, and a back or side wall 281, all of which are preferably made from sheet metal. A suitable cover 278a is removably secured to the outer edges of the walls 275 to 278 inclusive. The housing 274 is also provided with a transverse or horizontally disposed partition 282 which extends between the wall 278 and a vertically extending partition 283.

It will be observed in Figures 1, 2, 3, 5, 7 and 8 that the housing 274 is supported by a substantially Z-shaped bracket 279 of welded construction, the upper horizontal leg of which is penetrated by suitable screws 279a (Figure 3) which screws are threadably embedded in the side wall 281 of the housing 274. This bracket 279 extends downwardly and the horizontal lower leg thereof is suitably secured, as by welding, to the upper surfaces of a pair of transverse frame members 280 and 280a opposed ends of which are suitably secured, as by welding, to the proximate surfaces of the longitudinally extending frame members 23 and 26 of the framework 10 (Figures 7, 8 and 11).

Figure 23:
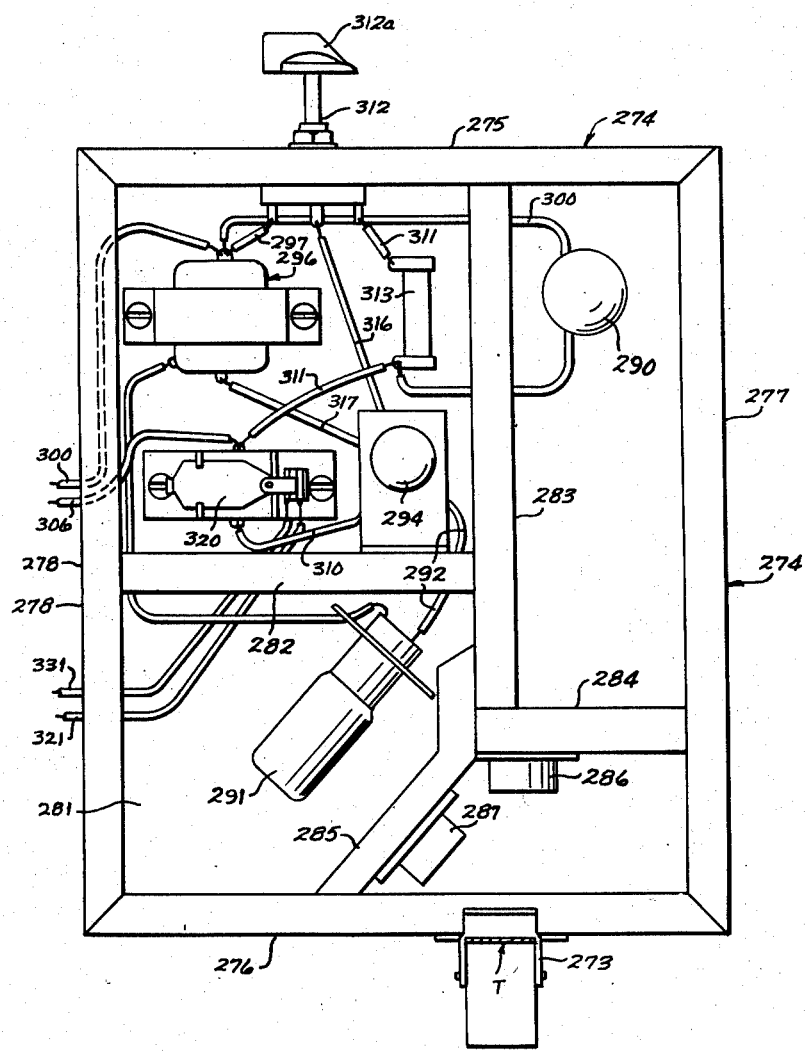
Figure 23 is an elevation of the tape feed control unit taken substantially along the line 23—23 but showing the cover plate removed.

The partition 283 extends from the lower surface of the upper wall 275 and terminates short of the lower wall 276 and has suitably connected to the lower end thereof the inner end of a second horizontally disposed partition 284 which extends outwardly or to the right in Figure 23 and is suitably connected to the front wall 277. An angularly-disposed partition 285 also extends between the partition 284 and the bottom wall 276. The partitions 284 and 285 are provided with suitable inclosures 286 and 287, respectively, in which suitable magnifying lenses, not shown, may be disposed and which are disposed at such an angle relative to each other as to focus upon the guide member 273 and at the edge thereof past which the opaque areas T-1 on the tape T (Figure 24-A) are moved by means to be presently described.

The side wall 281 of the housing 274 has a suitable light ray emitting means secured thereto within the confines of the partitions 283 and 284 and the walls 275 and 277, this light ray emitting means being shown in the form of an incandescent lamp 290. The electrical devices disposed within the housing 274 are shown schematically in Figure 24-A. It will be observed in Figures 23 and 24-A that the light rays emitted by this incandescent lamp 290 are directed to and concentrated upon the tape T and, upon the portions of the tape T between the opaque areas T-1 moving past the point to which the light rays from the incandescent lamp 290 are directed, these light rays are then reflected through the magnifying lens disposed within the housing 287 to a photoelectric cell 291.

The photo-electric cell is suitably secured to the side wall 281 of the housing 274. The photoelectric cell 291 has wires 292 and 293 extending therefrom and the wire 292 is connected to one of a pair of grids disposed within an amplifier tube 294 of usual construction. The other of the grids in the amplifier tube 294 has a wire 295 extending therefrom which is connected at its other end intermediate the ends of the wire 292.

The end of the wire 293, remote from the photo-electric cell 291, is connected to one end of a transformer primary coil 296a, which is a part of a transformer 296, and to the other end of which a wire 297 is connected. This wire 297 is connected, remote from the primary coil 296a, intermediate the ends of a wire 300 which extends through the wall 278 of the housing 274 and thus to a master switch 301 (Figure 24). This master switch 301 also has one end of a wire 302 connected thereto which is connected at its other end to a lead wire 303 which extends to one side of a suitable connector such as a male plug 304 which is adapted to be plugged into a suitable source of electrical energy, not shown.

The male plug 304 also has a lead wire 305 extending from the side thereof remote from the side to which the lead wire is connected. The lead wire 305 has one end of a wire 306 connected thereto (Figure 24) which extends through the wall 278 of the housing 274 (Figures 23 and 24-A) and is connected to one end of a relay coil 307. The end of the relay coil 307 remote from the end to which the wire 306 is connected has a wire 310 connected thereto which extends to the plate disposed within the amplifier tube 294. The wire 306 also has one end of a wire 311 connected thereto, adjacent the relay coil 307 in Figure 24-A, and this wire 311 extends to the right and then upwardly and is connected to one side of a rheostat 312 and this wire 311 also has a suitable resistance 313 interposed therein. A control knob 312a is shown, in Figures 1 to 5, inclusive, and 23, projecting from the upper wall 275 for controlling the rheostat 312.

A wire 314 is connected to the end of the rheostat 312 remote from the end to which the wire 311 is connected and extends to the left and then downwardly to one side of a secondary coil 296b which is a part of the transformer 296. The opposite end of the secondary coil 296b has a wire 315 connected thereto which is also connected intermediate the ends of a wire 316. One end of the wire 316 is connected to the plunger of the rheostat 312 and the other end thereof is connected to another plate disposed within the amplifier tube 294.

The cathode in the amplifier tube 294 has one end of a wire 317 connected thereto which is tapped off of the medial portion of the secondary coil 296b of the transformer 296. The other side of the cathode is connected intermediate the ends of the wire 295 heretofore described. A switch bar 320 (Figure 24-A) is disposed adjacent one end of the core surrounded by the relay coil 307 and is normally biased away from this core and has a contact on the free end thereof to which one end of a wire 321 is connected. This wire 321 extends from Figure 24-A to Figure 24 and is connected to one side of a normally open switch 322, to the other side of which a wire 323 is connected.

The end of the wire 323 remote from the switch 322 is connected intermediate the ends of the wire 32 heretofore described as extending from the motor 31. The end of the wire 32 remote from the electric motor 31 is connected to one side of a relay 324 having a core rod 325 which is surrounded by a relay coil 326. One end of the relay coil 326 is connected intermediate the ends of the lead wire 303 by means of a wire 327 and the other end of the relay coil 326 is connected to one side of a manually operable switch 328. The side of the switch 328 remote from the side to which the relay coil 326 is connected is connected to the lead wire 305 by means of a wire 329. Upon the manually operable switch 328 being closed, this switch causes energization of the coil 326 thus completing a circuit between the wires 303 and 32 and also completing a circuit between the wires 305 and 33. Referring again to Figure 24-A, it will be observed that there is a contact 330 disposed within the housing 274 which is normally disposed in spaced relation to the contact on the free end of the switch bar 320 and to which one end of a wire 331 is connected. The wire 331 also extends through the wall 278 of the housing 274 and extends to Figure 24 where it will be observed that this wire 331 is connected to the wire 323 at the switch 322.

The sensitive switch 322 is controlled through the medium of a leaf spring member 332 which is secured to the housing of the switch 322 at one end thereof and an intermediate portion of which is engaged by the plunger of the switch 322. This leaf spring member 332 extends upwardly in Figure 24 and is biased against the peripheral surface of a cam wheel 334 fixedly mounted on a shaft 335. The manner in which the shaft 335 is mounted and driven will be later described.

It will be observed in Figure 24 that the wire 321, which is connected with the switch 322, has one end of a wire 336 connected intermediate the ends thereof which extends downwardly and is connected to one side of a solenoid 337 to the other side of which one end of a wire 340 is connected. The end of the wire 340 remote from the solenoid 337 is connected intermediate the ends of the wire 33 extending from the electric motor 31 heretofore described. The solenoid 337 has a plunger 341 extending therefrom which is instrumental in controlling the intermittent feeding of the tape T in a manner to be later described. The shaft 335 also has fixedly mounted thereon a cam wheel 342 which is engaged by a leaf spring member 343a which controls a normally open switch 343 (Figure 24). The switch 343 has wires 344 and 345 connected to opposed sides thereof. The end of the wire 345 remote from the switch 343 is connected intermediate the ends of the wire 32 and the end of the wire 344 remote from the switch 343 is connected to one side of a solenoid 346.

The other side of the solenoid 346 has one end of a wire 347 connected thereto. The end of the wire 347 remote from the solenoid 346 is connected intermediate the ends of the wire 33.

The solenoid 346 has a solenoid plunger 350 extending therefrom which is instrumental in effecting operation of the means for cutting the tape into predetermined lengths to form the individual labels L therefrom, as will be more fully described later in this context. As heretofore stated, the solenoid plunger 341 (Figures 1, 12 and 24) is instrumental in effecting the feeding of the tape T to the machine and operation of this solenoid 337 is controlled by the switch 322 and the reflection of light rays from the tape T to the photoelectric cell 291 shown in Figures 23 and 24-A. It might be stated that the rheostat 312 is merely provided for varying the sensitivity of the amplifier tube 294.

In operation, the high point of the cam 334 (Figure 24) closes the switch 322 to complete a circuit to the solenoid 337 thus causing the solenoid core 341 to move outwardly in Figure 1 or from left to right in Figure 12. At this time, the tape T will have previously stopped with one of the opaque areas T-1 impinged upon by the light rays from the incandescent lamp 290 and, therefore, the light rays would not be reflected from the tape T.

Referring to Figure 12, it will be observed that the free end of the solenoid plunger 341 has a screw 351 threadably embedded therein which slidably penetrates the lower end of a tape feed actuating arm 352 which extends upwardly and is fixedly mounted on the rear end of a stub shaft 353. The stub shaft 353 is oscillatably mounted in a bearing bracket 354 (Figures 12 and 16) which extends inwardly at an angle and then downwardly and is suitably secured, as by a pair of horizontally spaced bolts 355, to a bearing stand 356. The lower end of the tape feed actuating arm 352 (Figure 12) is normally urged in a clockwise direction against a stop plate 357 as by a tension spring 358. The stop plate 357 is suitably secured to the upper surface of the transverse frame member 245 by one of the screws 247 heretofore described.

In order to insure that the tape feed idler roll, to be presently described, may be urged tightly against the corresponding tape feed roll, to be later described, the screw 351 is surrounded by a compression spring 360 which permits the solenoid plunger 341 to move from left to right after the tape feed actuating arm 352 has ceased its movement in a counter-clockwise direction.

The front end of the stub shaft 353 has the outer end of an arm 361 fixedly mounted thereon (Figures 1, 5, 6, 11, 12, and 16). This arm 361 extends inwardly and has an idler tape feed roll 362 mounted for rotation thereon. This idler tape feed roll 362 is preferably covered with a friction material such as rubber or the like so as to frictionally engage the tape therebeneath for advancing the same into the machine.

Disposed below and normally spaced from the idler tape feed roll 362 is a driven tape feed roll 363 which is also preferably covered with a friction material such as rubber or the like. This driven tape feed roll 363 is fixedly mounted on the front end of a shaft 364 (Figures 1, 11 and 16) which is rotatably mounted in the upper portion of the bearing stand 356. The rear end of the shaft 364 has a sprocket wheel 365 fixedly mounted thereon (Figures 5 and 12) which is engaged by an endless sprocket chain 366.

Figure 4:
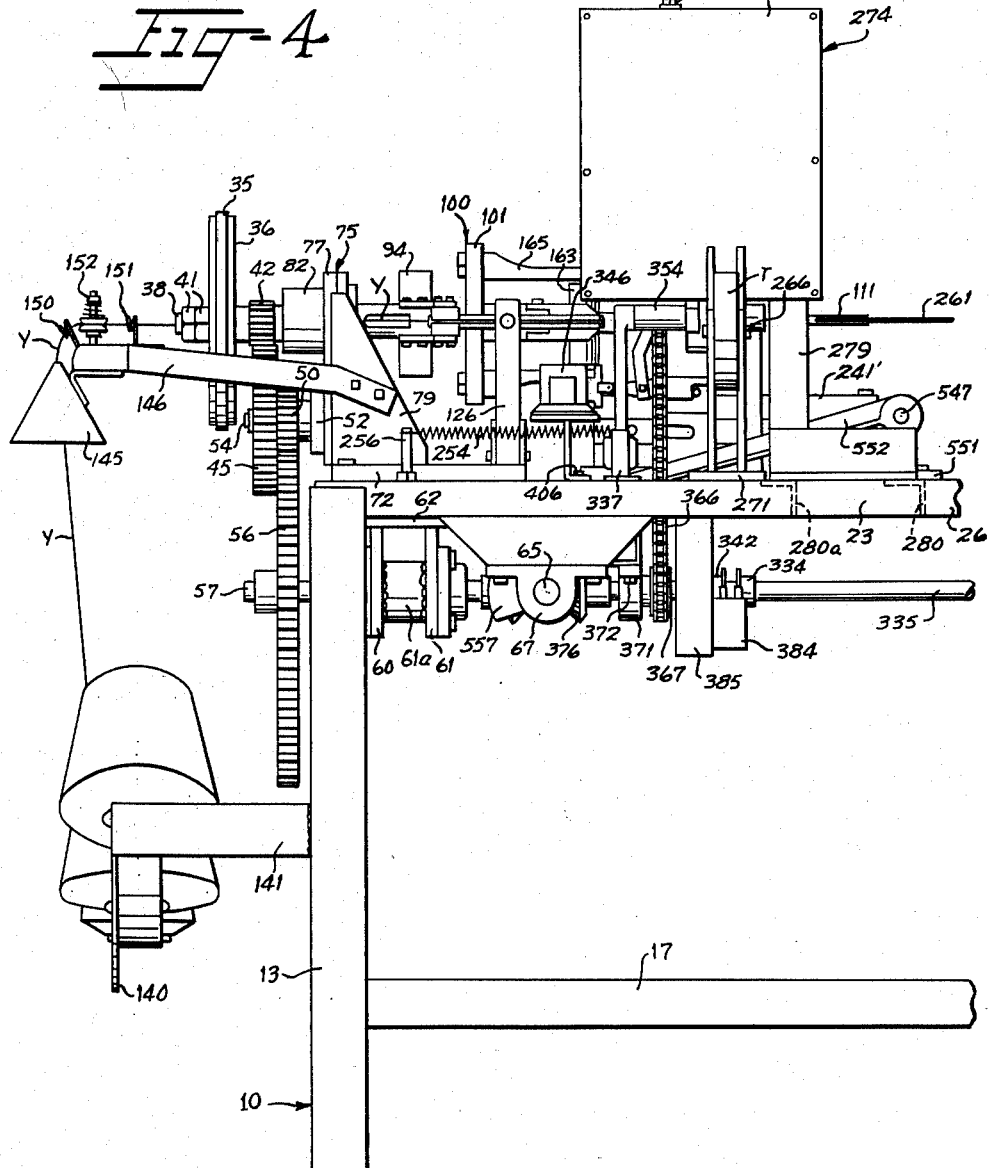
Figure 4 is a side elevation of the improved machine showing the left-hand side of the machine with parts broken away and being taken looking substantially along the line 4—4 in Figure 2.

The sprocket chain 366 extends downwardly and is mounted on a sprocket wheel 367 (Figure 4) which is fixedly mounted on the shaft 335 heretofore described. The shaft 335 is rotatably mounted in bearing blocks 370 (Figures 7 and 8) and 371 (Figure 4). The bearing block 370 is suitably secured to the lower surface of the front transverse frame member 22 and the bearing block 371 is suitably secured, as by screws 372, to the lower surface of a lower transverse frame member 373 (Figure 8) which is shown in the form of a channel bar and which is welded, at its outer end, to the lower surface of the longitudinally extending side frame member 23 and is also welded to the lower surface of a transverse frame member 374.

The transverse frame member 374 is welded at opposed ends thereof to the longitudinally extending frame members 23 and 26. It will be observed in Figure 8 that the frame member 374 is cut away to form a notch 375 therein which is provided for purposes to be later described. The shaft 335 extends longitudinally of the framework 10 and has a beveled gear 376 fixedly mounted on the rear end thereof which meshes with a similar beveled gear 377 fixedly mounted on the transverse cam shaft 65, this cam shaft 65 being driven in the manner heretofore described.

It is thus seen that the cam shaft 65 transmits rotation to the longitudinally extending shaft 335 which, in turn, causes rotation of the driven tape feed roll 363 in a clockwise direction in Figures 1 and 16.

It will be observed in Figures 1 and 16 that the tape T passes from the guide member 273 at the lower end of the housing 274 beneath a guide roll, to be later described, and then passes between the upper and lower or idler and driven tape feed rolls 362 and 363. The tape T normally rests in engagement with the upper surface of the driven tape feed roll 363 but is not of sufficient weight to cause the tape to be fed by this driven tape feed roll 363 at any time except that in which the idler tape feed roll 362 is moved downwardly into engagement with the upper surface of the tape to, in turn, urge the tape tightly against the upper surface of the driven tape feed roll 363.

In order to insure that the position of the adjacent labels L superimposed on the tape T, relative to the housing 274 is such that the tape will be severed at the juncture of adjacent labels L, there is provided a flanged stationary guide roll 380 which is eccentrically and fixedly mounted on a shaft 381 which extends forwardly as shown in Figure 6 and is adjustably secured, as by a set screw 382, in the upper end of a substantially L-shaped bracket 383.

Figure 22:
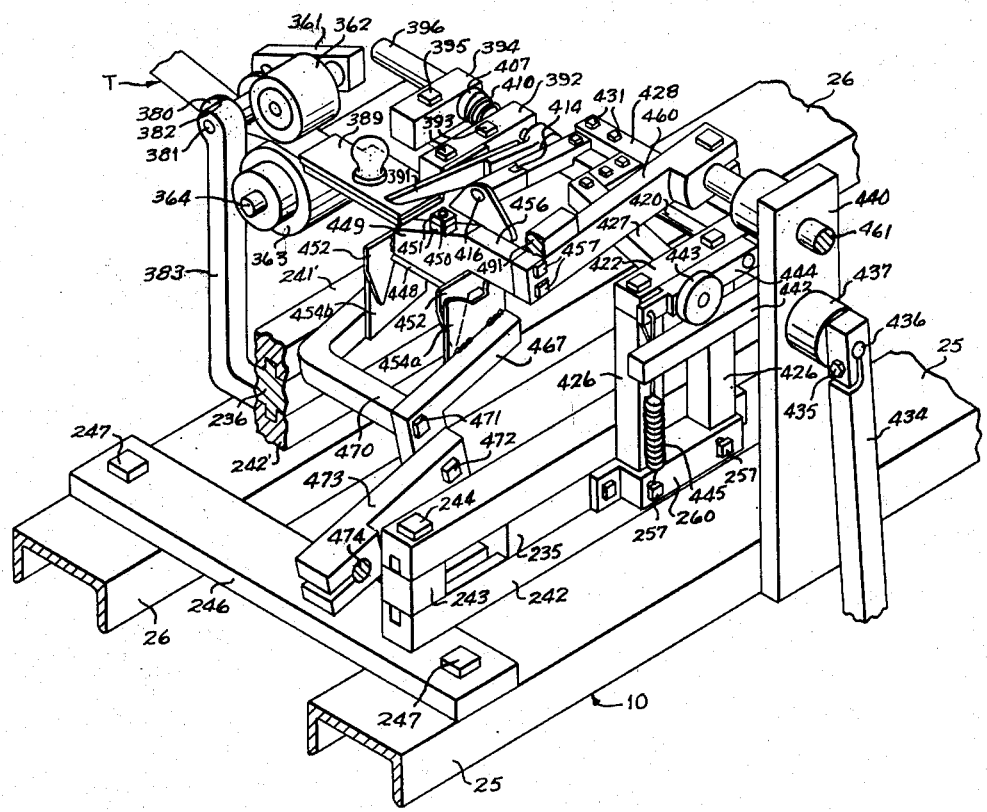
Figure 22 is an enlarged isometric view looking at the central portion of Figure 2 and looking from the front of the machine, with some parts broken away and others shown in section.

It will be observed in Figure 6 that the length of the roll 380 between the flanges is substantially equal to the width of the tape T to insure proper guidance of the tape T. The bracket 383 extends downwardly in Figure 1 and is suitably secured, as by welding, to the upper surface of the longitudinally extending frame member 26 (Figures 11 and 22). It is thus seen that, by adjusting the position of the roller 380 about the axis of the shaft 381, the length of tape between the feed rolls 362 and 363 and the housing 274 may be varied as desired.

Now, referring again to Figures 24 and 24-A, it is evident that, upon any one of the opaque areas T-1 moving into the line of sight of light rays from the incandescent lamp 290, the tape T will cease to move beyond this point because the circuit to the relay coil 307 will be broken thus permitting the switch bar 320 to move upwardly in Figure 24-A to, in turn, open the circuit to the solenoid 337 in Figure 24. Thus, in order to initiate each movement of the tape T for feeding each additional label to the machine, it is necessary that the tape T be moved by means other than the reflection of the light rays from the tape to the photoelectric cell 291 because the opaque areas T-1 will not reflect the light rays which are directed thereto from the lamp 290.

Therefore, the raised portion of the cam wheel 334 (Figure 24) is so arranged as to engage the leaf spring member 332 to thereby close the switch 322 immediately following the movement of the skein transfer bars 182 and 182' forwardly and outwardly to where they assume the position shown in Figure 19. Since the switches 322 and 343 are fixed to the machine in a manner to be later described, the raised portions of the cam wheels 334 and 342 will cause the corresponding switches 322 and 343 to close upon engaging the respective leaf spring members 332 and 343a in Figure 24.

When the cam wheel 334 causes the switch 322 to close, electrical energy passes through the solenoid 337 to cause the solenoid plunger 341 to move outwardly with respect to the center of the machine and to further cause the idler tape feed roll 362 to move downwardly into resilient engagement with the upper surface of the tape T passing over the driven tape feed roll 363.

Since the driven tape feed roll 363 rotates continuously, in the manner heretofore described, the tape T will be advanced to thus move the corresponding opaque area T-1 out of the line of sight of the light rays from the lamp 290 and to expose the corresponding light reflecting areas between adjacent areas T-1 on the tape to the light rays 290. Therefore, the circuit is completed to the solenoid 337 in Figure 24-A by the switch 322 and the relay switch bar 320 simultaneously. However, the period during which the cam wheel 334 causes the switch 322 to remain closed is such that the switch 322 will open before the next succeeding opaque area T-1 on the tape T will have moved into the line of sight of the light rays from the incandescent lamp 290. Thus, the length of tape admitted to the machine by the tape feed rolls 362 and 363 is determined by the spacing of the opaque areas T-1 on the tape T.

It will be observed in Figures 3 and 4 that the switches 322 and 343 are suitably secured to a plate 384, which is, in turn, suitably secured to a bracket 385 which extends upwardly in Figure 4 and is suitably secured, as by welding, to the inner surface of the longitudinally extending frame member 23.

Thus the tape feed rolls 362 and 363 advance the tape T in a step-by-step manner onto a platen 386 which is provided with a groove 387 in the upper surface thereof of the same width as the tape T and is of slightly greater depth than the thickness of the tape T (Figure 6). The platen 386 is suitably secured, as by screws 388 (Figures 6, 12 and 16), to a lip portion 356a integral with the bearing stand 356 and disposed at the upper end thereof. A suitable manually removable flat bottomed weight member 389 (Figures 2 and 22) rests upon the platen 386 and surmounts the groove 387 in the platen 386 in order to prevent the tape T from buckling as it is slid along the groove 387 in the upper surface of the platen 386.

As the tape T is advanced, in the manner heretofore described, the tape passes between a lower or stationary cutting blade 390 and an upper or movable cutting blade 391. The blade 390 is disposed in substantially the same horizontal plane as the bottom of the groove 387 in the platen 386 and this blade extends rearwardly and is suitably secured, as by welding, to the inner surface of a bearing block 392 which is suitably secured, as by screws 393 to the upper surface of the platen 386.

This platen 386 also has a bearing block 394 secured thereon, by any suitable means such as a screw 395, and spaced outwardly of the bearing block 392. These bearing blocks 392 and 394 have the reduced portion of a movable cutter blade pivot shaft 396 oscillatably mounted therein. (Figures 6, 12 and 16.) The inner end of this pivot shaft 396 has an arm 397 fixedly mounted thereon which extends forwardly and to which the rear portion of the movable tape cutting blade 391 is suitably secured as by welding.

It will be most clearly observed in Figure 12 that the outer end of the pivot shaft 396 has the upper end of a cutting blade actuating arm 400 fixedly mounted thereon which extends downwardly and is pivotally connected, as at 401 (Figures 4, 11, 12 and 24), intermediate the ends of a substantially horizontally disposed thrust rod or arm 402. The rear end of this arm 402 is pivotally connected to the front end of the solenoid plunger 350 extending from the solenoid 346 (Figure 24). The front end of the rod or arm 402 is normally urged against a stop pin 403 (Figure 11) by a tension spring 404 which is connected at its rear end to the front end of the arm 402 and the front end of which is connected to the substantially L-shaped bracket 383 heretofore described.

The solenoid 346 is suitably secured to a substantially T-shaped bracket 405 which extends downwardly and has a laterally projecting portion thereon which is suitably secured, as by screws 406 (Figure 4), to the upper surface of the transverse frame member 374. The solenoid 337 is also suitably secured to the upper surface of the transverse frame member 374 (Figures 4, 5, 6 and 8).

Now, referring to Figure 24, it will be observed that the high point of the cam wheel 342 is disposed substantially diametrically opposite the high point of the cam 334 so the high point of the cam 342 will not close the switch 343 until after the tape T has been fully advanced the equivalent of the length of one of the labels L thereon. Upon the switch 343 being closed by cam wheel 342, a circuit is completed to the solenoid 346, as is clearly shown in Figure 24, and this will cause the plunger 350 associated with the solenoid 346 to move from right to left in Figure 2 or rearwardly in Figures 2, 4 and 11. This will cause movement to be imparted to the pivot shaft 396 in a clockwise direction in Figure 11, thus moving the movable tape cutting blade 391 downwardly (Figures 16 and 22) for severing a label L from the tape T (Figures 19 and 20).

It will be observed in Figures 12, 16 and 22 that the reduced portion of the pivot shaft 396 has a collar 407 fixed thereon and disposed between the bearing blocks 392 and 394. A compression spring 410 surrounds the reduced portion of the pivot shaft 396 and is disposed between the bearing block 392 and the collar 407 and this collar 407 is preferably spaced from the bearing block 394, as shown in Figure 12, so the compression spring 410 will normally urge the shaft 396 from right to left in Figures 6 and 22 to thereby insure that the movable tape cutting blade 391 is held resiliently against the lower or stationary blade 390 (Figure 16). Thus, these blades 390 and 391 cooperate in the manner of shears in cutting the tape T into labels.

As the label on the free end of the tape T, that is, the end thereof remote from the roll 265 in Figure 1, is advanced into the machine preparatory to being severed from the tape T, this label is positioned on a label positioning plate 411 with a substantial portion of the label extending beyond the front edge of the plate 411 as the plate 411 is disposed in a rearward position. The manner in which this label positioning plate 411 is supported and operated will be presently described. (Figures 6, 12, 16 and 18.)

Before the label L positioned on the label positioning plate 411 is severed from the tape T, the rear edge portion of the label resting upon the upper surface of the label positioning plate 411, at the leading edge thereof, is clamped against the upper surface of the label positioning plate 411 by means of a label clamping member 412. This label clamping member 412 is shown in the form of a substantially vertical plate which extends upwardly and is suitably secured, as by welding, on the free end of a bar 413 which is loosely keyed, as at 414, on the free end of a clamp carrying bar 415. The bar 413 and the corresponding clamping member 412 are secured for pivotal movement on the free end of the bar 415 by a screw 416 (Figure 18) which slidably penetrates the clamp member 412 and the bar 413 and is threadably embedded in the free end of the clamp carrying bar 415.

The clamp carrying bar 415 extends rearwardly and is suitably secured, as by a screw 417, to an enlarged inner portion of a clamp pivot shaft 420, the reduced portion of which is oscillatably mounted in a block 421 and a bar 422 (Figures 6 and 22). The block 421 is suitably secured, as by screws 423, to the upper surface of the label positioning plate 411. The bar 422 is suitably secured, as by screws 425 to the upper ends of a pair of forwardly and rearwardly spaced vertically disposed posts 426 (Figures 7 and 22).

The posts 426 extend downwardly and the reduced lower ends thereof slidably penetrate the support block 260 and are secured therein by the set screws 257 heretofore described. The bar 422 is also instrumental in supporting the label positioning plate 411, there being a pair of horizontally disposed inwardly converging positioning plate support bars 427 and 428 suitably secured, as by welding, to the inner surface of the support bar 422. The label positioning plate 411 is suitably secured to the lower surfaces of the bars 427 and 428 as by screws 431.

It is thus seen that the clamping member 412 may adjust itself to the upper surface of the label positioning plate 411 in order to clamp the corresponding edge of the label L for its full length against the upper surface of the label positioning plate 411. The position of the clamp member 412 is determined by a cam wheel 432 (Figures 1, 2, 3, 5, 6, and 21) which is fixedly mounted on the cam shaft 65. The cam wheel 432 is engaged by a cam follower 433 which is shown in the form of a roller rotatably mounted in the bifurcated lower end of a cam follower arm 434.

Figure 21:
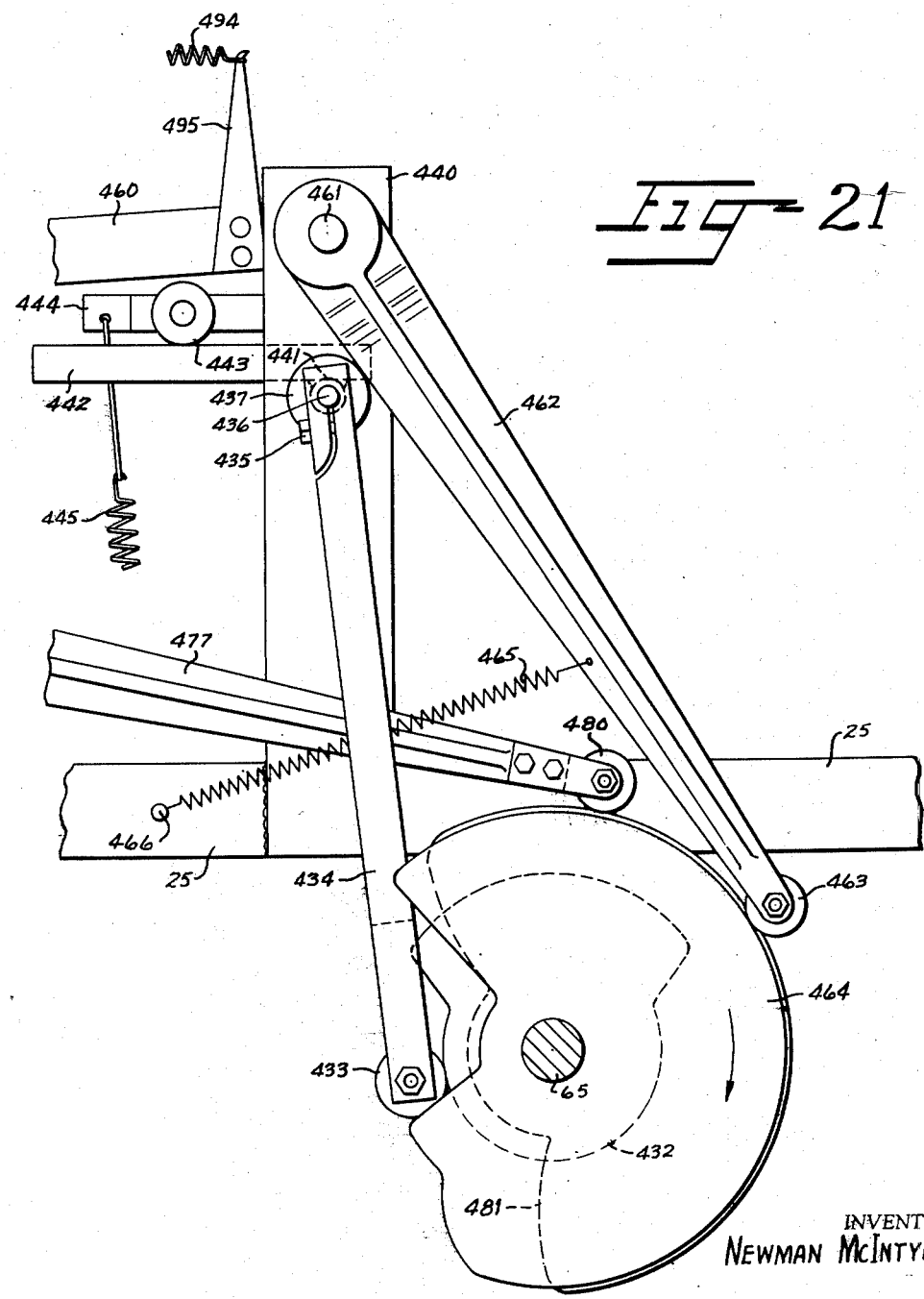
Figure 21 is an enlarged elevation, with parts in section, taken substantially along the line 21—21 in Figure 1.

The cam follower arm 434 extends upwardly in Figures 1, 21 and 22 and is fixedly mounted, as by a screw 435, on a reduced outer portion 436 of a shaft 437. The shaft 437 is oscillatably mounted in a bearing stand 440 and has a reduced portion 441 on the inner end thereof to the upper surface of which the rear end of a cam lever bar 442 is fixedly secured, as by welding. The cam lever bar 442 extends forwardly (Figures 6, 21 and 22) and the upper surface thereof is engaged by a follower wheel 443 which is rotatably mounted intermediate the ends of a clamp actuating bar 444.

The clamp actuating bar 444 extends rearwardly and is fixedly mounted on the outer end of the reduced portion of the clamp pivot shaft 420. The front end of the clamp actuating bar 444 has the upper end of a tension spring 445 connected thereto which extends downwardly and is connected to one of the set screws 257 (Figures 7, 12 and 16) projecting from the support block 260.

It is thus seen that the tension spring 445 normally urges the follower wheel 443 downwardly into engagement with the cam lever bar 442 and, in so doing, causes the cam follower 433 on the lower end of the follower arm 434 (Figure 21) to bear against the peripheral surface of the cam wheel 432. Thus, the tension spring 445 also normally urges the label clamping member 412 downwardly into engagement with the upper surface of the label positioning plate 411 substantially as shown in Figure 18.

Inasmuch as the label positioning plate 411 (Figures 15 and 18) moves forwardly and rearwardly with the carriage, comprising the transverse carriage bars 210 and 211 and the longitudinally extending carriage side bars 235 and 236, the cam lever bar 442 is provided to permit the follower wheel 443 to ride upon the bar 442 and to also cause the clamp member 412 to respond to variations in the configuration of the periphery of the cam wheel 432 (Figure 21).

Now, referring to Figure 13, it is evident that upon the high point of the cam wheel 252 moving into engagement with the cam follower 250, not only are the skein transfer bars 182 and 182' advanced in the manner heretofore described, but the label positioning plate 411 and the label clamping member 412 are also advanced accordingly, during which the clamping member 412 is disposed in the position shown in Figure 18 in order to clamp the corresponding edge of the label against the upper surface of the label positioning plate 411 and to subsequently move the label to a position above the convolutions of yarn at the stations E in Figures 19 and 20.

When the label positioning plate 411 has reached the end of its forward stroke, the high point of the cam 432 (Figure 21) engages the cam follower 433 to thus elevate the label clamping member 412, and simultaneously therewith, the recess 252c in the cam wheel 252 (Figures 13 and 15) moves into engagement with the cam follower 250 thus permitting the label positioning plate 411 and the label clamping member 412 to move rearwardly slightly to move free of the corresponding edge of the label previously supported thereby.

At this time, the label is permitted to move downwardly onto the upper surface of the group of convolutions of yarn wound about the skein holder bars 110 and 111 at the station E and is further directed downwardly by a weight member 448 which is mounted for vertical sliding movement in the grooved lower surface of a first or upper folding member 449. The walls of the groove in the lower surface of the upper folding member are flared outwardly for obvious reasons.

As the first or upper folding member 449 is moved downwardly, in a manner to be presently described, the weight member 448 engages the upper surface of the label resting against the upper surface of the corresponding group of convolutions of yarn and then recedes into the grooved lower surface of the first or upper folding member 449 as the outwardly flared walls of said groove move astride opposed sides of the group of convolutions of yarn at station E substantially as shown in Figure 15. It will be observed in Figures 15 and 18 that the weight member 448 has a rod 450 suitably secured to the upper surface thereof, as by welding, which is mounted for vertical sliding movement in the upper folding member 449. The upper end of the rod 450 has a pair of lock nuts 451 threadably mounted thereon for limiting downward movement of the weight member 448 as the upper folding member 449 is subsequently moved upwardly to inoperative position in a manner to be presently described.

The first or upper folding member 449 also constitutes a part of an upper or first bunching device in that it has welded to opposed sides thereof a pair of upper bunching members in the form of plates 452 which are provided with substantially flat bottomed inverted V-shaped notches therein, the legs of which move downwardly astride the corresponding groups of convolutions of yarn and adjacent opposed ends of the corresponding label as the first or upper folding member 449 moves downwardly in arranging the label in the form of an inverted letter U with the legs thereof disposed astride and extending below the corresponding group of convolutions of yarn at the station E.

As the upper bunching plates 452 engage the corresponding group of convolutions of yarn, a pair of laterally spaced lower bunching plates 454a and 454b move upwardly simultaneously therewith, these lower bunching plates 454a and 454b also being provided with substantially V-shaped notches in the upper edges thereof and the legs of which move astride the group of convolutions of yarn. As is clearly shown in Figures 19 and 20, these lower bunching plates 454a and 454b are spaced slightly further apart from each other than the upper bunching plates 452 and thus move upwardly adjacent opposed sides of the plates 452 to cooperate therewith in bunching the medial portions of the convolutions of yarn at the station E. The manner in which these lower bunching plates 454 are mounted will be later described.

Now, referring to Figures 1, 15, 18 and 22, it will be observed that the first or upper folding member 449 has an outwardly extending portion 456 integral therewith which is suitably secured as by screws 457 to the front end of an upper folder carrying arm 460. The upper folder carrying arm 460 extends rearwardly and is fixedly mounted on a stub shaft 461 which extends outwardly (Figure 6) and is oscillatably mounted in the upper end of the bearing stand 440 (Figures 21 and 22). The shaft 461 extends outwardly beyond the bearing stand 440 and has the upper end of an upper folder follower arm or actuating arm 462 fixedly mounted thereon which extends downwardly and rearwardly at an angle (Figure 21) and has a cam follower 463 rotatably mounted in the lower end thereof.

This cam follower 463 is normally urged in a clockwise direction in Figure 21 against the periphery of a cam wheel 464 which is also fixedly mounted on the cam shaft 65. The cam follower 463 is urged against the cam wheel 464 by a tension spring 465 which is connected at one end thereof intermediate the ends of the upper folder follower arm 462 and extends forwardly and is connected at its front end to a suitable spring anchor pin 466 projecting outwardly from the frame member 25.

It is thus seen that the tension spring 465 (Figure 21) normally urges the cam follower 463 into engagement with the periphery of the cam wheel 464 and also urges the first or upper folding member 449 to a raised position and it is manifested by the configuration of the peripheral surface of cam wheel 464 in Figure 21 that this cam will cause the upper or first folding member to assume a lower or operative position with the parts in the position shown in Figure 21. The cam then causes the upper folding member 449 to move upwardly to the limit of its upward movement following which there is a short dwell and then the upper folding member 449 moves downwardly in two steps in order to permit the weight member 448 to first engage and dwell upon the upper surface of the label as it is deposited upon the corresponding group of convolutions of yarn on the skein holder bars 110 and 111. The upper folding member 449 then continues its downward movement to fold the front and rear portions of the label downwardly adjacent opposed front and rear portions of the group of convolutions of yarn in the manner heretofore described.

The lower bunching plate 454a adjacent the skein holder bar 110 extends downwardly and is suitably secured, as by welding, to the inner surface of a substantially L-shaped arm 467 which extends rearwardly and has a second substantially L-shaped member 470 suitably secured thereto, as by a screw 471. The L-shaped member 470 extends inwardly or to the left in Figure 22 and the lower bunching plate 454b is suitably secured to the rear end of the member 470 by any suitable means such as welding.

The L-shaped arm 467 extends downwardly in Figures 15, 18 and 22 and is suitably secured, as by a screw 472, to the rear end of a lower bunching plate carrier arm or bar 473 which extends forwardly and is fixedly mounted on a stub shaft 474. The stub shaft 474 is oscillatably mounted in a bearing block 475 (Figures 1 and 2) which is suitably secured to the upper surface of the longitudinally extending intermediate frame member 25.

The stub shaft 474 also has the front end of a lower bunching plate follower arm 477 (Figure 2) fixedly mounted thereon which extends rearwardly and has a cam follower 480 mounted for rotation in the rear end thereof (Figure 21). This cam follower 480 engages the periphery of a cam wheel 481 against which it is urged by gravity. It is thus seen that when the cam follower 480 is engaged by the high portion of the cam wheel 481, the lower bunching plates 454a and 454b assume the position shown in Figures 15 and 18 and, upon the low point of the cam wheel 481 moving into engagement with the cam wheel 480, the lower bunching plates 454a and 454b are permitted to move downwardly to inoperative position by gravity.

While the upper folding member 449 and the upper and lower bunching plates 452 and 454a and 454b dwell in the position shown in Figures 15 and 18, a second or lower front folding member 482 moves upwardly and forwardly from the position shown in Figure 18 to the position shown in Figure 15, immediately after which a third or rear lower folding member 483 moves forwardly from the position shown in Figure 18 to the position shown in Figure 15 and thus the second and third folding members 482 and 483 fold the corresponding portions of the label L around and beneath the lower surface of the corresponding group of convolutions of yarn.

While these folding members 482 and 483 are in the position substantially as shown in Figure 15, a heated sealing member 484 moves upwardly to engage the lower surface of the rearward flap of the label L to thus adhesively secure the opposed edges of the label together, the tape T having previously been treated with a suitable normally dry adhesive which is responsive to relatively high temperatures to render the normally dried adhesive fusible. The manner in which the members 482, 483 and 484 are mounted and operated will be presently described.

It will be noted that the second and third folding members 482 and 483 move rearwardly and forwardly, respectively, to substantially the positions shown in Figure 18 as the sealing member 484 moves to substantially the position shown in Figure 15 so the opposed edges of the label L do not become separated in the interim between the movement of the second and third folding members 482 and 483 from the position shown in Figure 15 to that shown in Figure 18 and that in which the label is engaged by the sealing member 484 as shown in Figure 18.

The second or front lower folding member 482 is shown in the form of a horizontally disposed plate which extends forwardly and is suitably secured, as by welding, to the lower end of a substantially vertically disposed second folding member carrier rod 485. This rod extends upwardly and slidably penetrates a bracket 486 and has suitable lock nuts 487 thereon which engage the upper and lower surfaces of the bracket 486 for securing the rod 485 in the desired position. This bracket 486 extends forwardly and is fixedly mounted on a transverse shaft 490.

The shaft 490 is rotatably mounted in a bearing block 491 of welded construction which is suitably secured, as by screws 492, to the upper surfaces of the upper folder carrying arm 460 heretofore described. The shaft 490 has an enlarged outer portion 490a (Figure 6) integral therewith which has a spring anchor 493 projecting upwardly therefrom and to the upper end of which the front end of a tension spring 494 is connected. The rear end of the tension spring 494 is connected to a spring anchor 495 which extends downwardly in Figures 15 and 18 and is suitably secured to the outer surface of the upper folder carrying arm 460, as by welding. Thus, the tension spring 494 normally urges the shaft 490 in a counter-clockwise direction, and in so doing urges the second folding member to inoperative position.

It will be observed in Figure 1 that the rod forming the spring anchor 493 extends through the enlarged position 490a of shaft 490 and is normally urged into engagement with an adjustment screw 495a (Figures 6, 15 and 18) which threadably penetrates a bracket 495b secured to the bearing block 491 by any suitable means such as welding. Now, the enlarged outer portion 490a of the shaft 490 also has a crank arm 496 fixedly mounted thereon which extends downwardly and has a follower in the form of a roller 497 rotatably mounted thereon.

The tensioin spring 494 also urges the follower 497 towards the rear surface of an upstanding finger 500 (Figures 3 and 6) which extends downwardly and is suitably secured, as by bolts 501, to the inner surface of a crank arm 502 (Figures 1, 2, 3 and 6). The crank arm 502 extends downwardly and is fixedly mounted on one end of a shaft 503 which is oscillatably mounted in a bearing block 504. The bearing block 504 extends downwardly and is suitably secured to the upper surface of the transverse frame member 27 heretofore described (Figures 2, 3 and 6).

As is most clearly shown in Figures 1, 2 and 3, the outer end of the shaft 503 has the front end of a follower arm 506 fixedly mounted thereon which extends rearwardly and has a suitable cam follower 507 rotatably mounted thereon. This cam follower 507 normally rests in engagement with the upper peripheral surface of a cam wheel 510 (Figure 3) which is fixedly mounted on the cam shaft 65.

The cam wheel 510 is substantially circular and is provided with a notch 510a therein which, upon moving into engagement with the cam follower 507, permits the free rear end of the follower arm 506 to move downwardly, by gravity, and this will cause the finger 500 to move rearwardly or in a clockwise direction in Figure 3. Since the weight of the follower arm 506 is substantially greater than the tension in the tension spring 494, it is thus seen that the finger 500 will impart movement to the shaft 490 in a counterclockwise direction in Figure 3, or in a clockwise direction in Figures 15 and 18, to momentarily move the second folding member 482 rearwardly and upwardly to fold the corresponding flap of the label L beneath the corresponding group of convolutions of yarn extending between the skein holder bars 110 and 111 at the station E.

Now, as heretofore stated, the third folding member 483 moves into operative position, from the position shown in Figure 18 to that shown in Figure 15, immediately after and substantially simultaneously with the movement of the second folding member 482 into operative position. Now, this third folding member 483 is shown in the form of a plate which extends rearwardly and is suitably secured, as by a screw 511 (Figures 12, 15 and 18), to the upper surface of a horizontally disposed third folder supporting bar 513. This bar extends outwardly, as shown in Figures 12 and 15, and is suitably secured, as by welding, to a substantially vertically disposed arm 514.

This arm 514 extends downwardly and is suitably secured, as by screws 515, intermediate the ends of a third folder actuating arm or follower arm 516 (Figures 15 and 18). The follower arm 516 extends forwardly and is pivotally mounted, as at 517, on the front end of a bracket 520 which extends rearwardly and is suitably secured between the follower brackets 227, as by screws 521.

It is thus seen that the follower arm 516 moves forwardly and rearwardly in accordance with the surfaces of the cam wheel 252 engaging the cam follower 250 and, in so doing, causes like movement to be imparted to the third folding member 483. However, in order to raise and lower the third folding member 483, the follower arm 516 has a cam follower 522 rotatably mounted on the rear end thereof which is adapted to, at times, be engaged by a segmental cam member 523 which is suitably secured, as by screws 524, to one side of the cam wheel 252.

When the skein transfer bars 182 and 182' are moved to a forward position, during which the label positioning plate 411 also moves to a forward position, the high point of the segmental cam 523 engages the cam follower 522 to thus elevate the third folding member 483 from the elevation shown in Figure 18 to substantially that shown in Figure 15. The segmental cam 523 is so shaped that the front edge of the third folding member 485 will move downwardly as it moves forwardly to thus roll the corresponding portion of the label L around the corresponding group of convolutions of yarn wound about the skein holder bars 110 and 111.

The cam wheel 252 continues its rotation in a counterclockwise direction in Figure 15 and, in so doing, moves the segmental cam 523 free of the cam follower 522. However, the follower arm 516 is limited as to its downward movement by an adjustment screw 525 (Figures 13, 15, 16 and 18) which is engaged by a projection 526 extending from the lower medial portion of the follower arm 516. This adjustment screw threadably penetrates an angle clip 527 which extends inwardly and is suitably secured, as by welding, to the corresponding follower bracket 227. The adjustment screw 525 is locked in the desired position by a lock nut 530.

Referring to Figures 15 and 18, it will be observed that the sealing member 484 is relatively narrow at the upper edge thereof so as to provide a relatively narrow area for engaging the corresponding overlapping portions of the label for sealing opposed edges of the label together. This sealing member 484 extends downwardly and has an enlarged hollow portion 535 integral therewith in which a suitable heating element 536 is suitably mounted, this heating element 536 being shown schematically in Figure 24.

The heating element has wires 537 and 538 extending therefrom, the wire 537 being connected intermediate the ends of the wire 300. The wire 538 extending from the heating element 536 is connected to one side of a manually controlled rheostat 541 (Figures 18 and 24). The rheostat 541 (Figures 1 and 18) is provided with a suitable control knob 542 for controlling the temperature of the heating element 536. The rheostat 541 in Figure 24 has a wire 543 extending from the pointer thereof which is connected at its other end intermediate the ends of the lead wire 305 heretofore described.

Now, referring to Figures 1, 15 and 18, it will be observed that the enlarged hollow portion 535 of the sealing member 484 extends downwardly and forwardly at an angle and is suitably secured to the upper surface of and at the front end of a sealing member carrier arm 544. This sealing member carrier arm 544 extends forwardly and is fixedly mounted on a transverse shaft 547 (Figures 1, 2 and 6). In this instance, the front end of the arm 544 is split and, thus, the sealing member support arm 544 is secured on the shaft 547 by a bolt 550 penetrating the split front end portion of the arm 544. This bolt 550 is also utilized in securing the rheostat 541 to the front end of the sealing member 544.

Referring to Figures 1 and 2, it will be noticed that the shaft 547 is oscillatably mounted in a bearing block 551 which is suitably secured to the upper surface of the longitudinally extending intermediate frame member 26. This shaft 547 extends outwardly beyond the bearing block 551 and has the front end of a follower arm 552 fixedly mounted thereon which extends rearwardly and is limited as to its downward movement by a stop screw 553 threadably penetrating an angle clip 554. The angle clip 554 is suitably secured, as by welding, to the longitudinally extending frame member 26 (Figure 11).

The arm 552 extends rearwardly substantially beyond the angle clip 554 and passes through the notch 375 provided therefor in the frame member 374 (Figures 7, 8 and 11) and has a cam follower 556 mounted for rotation on the free rear end thereof. This cam follower 556 is adapted, to at times, be engaged by the peripheral surface of a cam wheel 557 which is fixedly mounted on the cam shaft 65 heretofore described.

It is thus seen that when the low point of the cam wheel 557 in Figure 11 is disposed adjacent the cam follower 556, the arm 552 rests upon the stop screw 553 and, in so doing, causes the sealing member 484 (Figure 15) to assume a lowered position, which is substantially lower than shown in Figure 15. However, upon the cam wheel 557 engaging the cam follower 556, the follower arm 552 is moved in a clockwise direction in Figure 11 to also cause like movement to be imparted to the sealing member 484 to move the same to the position shown in Figure 18 after which the sealing member will dwell in this position until the cam wheel 557 again moves out of engagement with the cam follower 556.

It is thus seen that I have provided an improved machine for economically producing skeins of yarn or the like with labels wrapped therearound and which machine is so constructed that the various parts thereof may be economically manufactured and easily assembled and also having means for adjusting the machine to accommodate different types of skeins of yarn as to the length of yarn in each skein.

It might be stated, that if so desired, the size of the gears 45 and 50 in Figure 17 may be varied in order to vary the number of convolutions or coils of yarn which are wound about the skein holder bars 110 and 111 between the periods during which the groups of convolutions of yarn are being advanced by the skein transfer bars 182 and 182' (Figures 19 and 20.)

In the drawings and specification, there has been set forth a preferred embodiment of the invention and although specific terms are employed, they are used in a descriptive and generic sense only and not for purposes of limitation, the scope of the invention being defined in the claims.

I claim:

1. In a winding machine of the type described, the combination of a skein holder comprising two bars arranged side-by-side and spaced apart, means for winding a yarn over the corresponding ends of the bars to form skeins successively, a driven rotatable member carrying said winding means, means for feeding the skeins along the bars, means slidably carried by the rotatable member for supporting the bars at the ends thereof adjacent the means for winding the yarn over the corresponding ends of the bars, guide members disposed adjacent the outer surfaces of said bars and spaced therefrom, a reciprocating locking device carried by the slidable means on the rotatable member and alternately engaging the guide member adjacent one of the bars while being free of the guide member adjacent the other of the bars and vice versa to permit the means for winding a yarn over the corresponding ends of the bars to pass between the guide members and the reciprocating locking device.

2. In a structure according to claim 1, said means for feeding the skeins along the bars comprising a skein transfer bar normally spaced adjacent the outer surface of each of the skein holder bars and having a plurality of inwardly projecting longitudinally spaced skein transfer prongs thereon, means operable automatically upon a predetermined number of coils of yarn being wound over said corresponding ends of the skein holder bars for moving said skein transfer bars inwardly to position the prongs thereon rearwardly of the skein last wound about the skein holder bars as well as rearwardly of any skeins previously wound about the bars, said lastnamed means also being operable to cause the skein transfer bars to move forwardly a predetermined distance and then outwardly to move the prongs out of engagement with the corresponding skeins of yarn thus advancing the skein of yarn last wound about the skein holder bars, and any skeins of yarn previously wound about the skein holder bars, forwardly on the skein holder bars with the skeins disposed in uniform spaced relation to each other.

3. In a structure according to claim 2, said skein holder bars having longitudinally extending grooves in the outer edges thereof and said prongs on the skein transfer bars being movable into said grooves to thus engage the portions of the coils of yarn which extend past the remote edges of the skein holder bars as they advance the same along said skein holder bars.

4. In a winding machine of the class described, the combination of a flyer, a driven shaft on which the flyer is fixedly and eccentrically mounted, a skein holder support slidably mounted on said shaft, a first skein holder bar and a second skein holder bar fixed at one end thereof on said skein holder support and in substantially diametrically opposed spaced relation to each other relative to the axis of the shaft, the outer surfaces of said skein holder bars being disposed within the circle defined by the path of travel of the flyer, means for preventing rotation of the skein holder bars comprising at least two guide members spaced adjacent the outer surfaces of the skein holder bars, a transversely reciprocable locking member slidably mounted on the skein holder bars, means for driving said reciprocable locking member for alternate reciprocation in the guide members on opposed sides of the skein holder bars in timed relation to said shaft, the length of the reciprocable member being such that one end of the reciprocable member extends from within one of the guide members beyond at least one of the skein holder bars while the opposite end of the reciprocable member is spaced from the other of the guide members as the flyer passes between the corresponding skein holder bar and the latter guide member to thus prevent rotation of the skein holder bars although the flyer revolves about the skein holder bars in directing yarn thereto.

5. In a structure according to claim 4, means carried by the reciprocable member for engaging and sliding each successive coil of yarn along the bars to position the same in side-by-side relation to the adjacent coil previously wound about the skein holder bars comprising a yoke member disposed between the skein holder bars and carried by the reciprocable member, a pair of diametrically opposed trunnion support arms projecting forwardly from the skein holder support and being disposed in substantially transverse alinement relative to the axis of the reciprocable member and terminating forwardly of the yoke member, a trunnion pivotally mounted between said trunnion support arms and having a rearwardly extending projection thereon, a follower carried by the free end of said rearwardly extending projection and disposed within the confines of said yoke member, said skein holder bars having longitudinally extending horizontal slots therein adjacent the skein holder support, a pair of diametrically opposed radially extending arms projecting from the trunnion in substantially right-angular relation to the rearwardly extending projection, the outer ends of said arms extending into said slots and each of said arms having a forwardly projecting portion on the outer end thereof projecting beyond the outer edges of the skein holder bars whereby, upon reciprocation of the reciprocable member, the forwardly projecting portions on said arms alternately engage the coil of yarn wound about the skein holder bars upon each revolution of the flyer to advance the latter coil of yarn along said bars and to position said latter coil of yarn against the coil of yarn last wound about the skein holder bars.

6. In a winding machine of the type described, the combination of a skein holder comprising at least two skein holder bars arranged side-by-side and spaced apart in substantially diametrically opposed relation to a common axis, a flyer revoluble about said common axis and having means for directing yarn about corresponding ends of the skein holder bars to form skeins successively, means for supporting the skein holder bars at the end thereof adjacent said flyer including a transversely reciprocable member, means connecting said bars with said reciprocable member to permit reciprocation of the reciprocable member transversely of said bars, guide means spaced outwardly of the path of travel of said flyer and being provided with openings coinciding with opposed ends of said reciprocable member for slidably receiving opposed ends of said reciprocable member, the reciprocable member being of such length that one end thereof is spaced from one of the guide means as the other end thereof is disposed within the opening in the corresponding guide means and means for imparting reciprocatory movement to the reciprocable member in timed relation to rotation of the flyer whereby the flyer passes between a corresponding end of the reciprocable member and one of the guide means as the other end of the reciprocable member is disposed within the opening in said guide means.

7. In a structure according to claim 6, means carried by the reciprocable member for engaging each coil of yarn as it is wound on the skein holder bars at a point substantially remote from the flyer for pressing the coils together for maintaining them in side-by-side relation, means operable in timed relation to the flyer upon a predetermined number of coils of yarn being wound on the skein holder bars for advancing successive skeins formed from said yarn along the bars in predetermined spaced relation to each other, a label applying station spaced substantially from the ends of said bars adjacent which the coils are fed thereto, means for feeding labels to a point above the path of travel of the skein and between the end of said skein holder bars at which the coils of yarn are fed thereto and the label applying station, a label positioning plate onto which one edge of each successive label is positioned, means for clamping the corresponding edge of said label upon the label being admitted to the positioning plate, means for moving the positioning plate forwardly to position the corresponding label above the label applying station, means operable automatically upon said label being positioned above the label applying station for releasing the label from the clamping means and means operable simultaneously with said last-named means for moving said label downwardly, bunching the medial portion of the corresponding skein of yarn together and simultaneously folding the label about the corresponding skein, means operable automatically for moving the opposed edges of the label over the underside of the corresponding skein in overlapping relation, means for securing the overlapping edges together, means operable automatically upon each skein being advanced adjacent the label applying station for positioning the intervening portion of yarn extending between adjacent skeins at a point spaced from adjacent skeins at the outer edge of one of the skein holder bars and means associated with the means for advancing the coils of yarn for severing said strand so positioned simultaneously with advancement of the skeins of yarn along the skein holder bars.

8. In a structure according to claim 7, said means for feeding labels comprising a tape having indicia thereon defining labels, said tape also having a plurality of longitudinally spaced opaque areas thereon, there being one of these areas for each of the labels on said tape, a severing mechanism disposed adjacent one side of said label positioning plate, guide means for the label disposed outwardly of said severing mechanism relative to the label positioning plate, a driven feed roll over which the tape is passed in advance of the tape moving onto the guide means therefor, a vertically movable friction feed roll disposed above the driven feed roll, a photoelectric control mechanism having a light source associated therewith and a photoelectric cell, means on the photoelectric mechanism through which the tape passes in its course to the feed rolls and wherein the light rays from the light source impinge upon said tape to reflect the light rays from the tape between the points at which the opaque areas are disposed to the cell, means responsive to the light rays being reflected from said tape to cause the vertically movable feed roll to engage the tape and press the same against the driven feed roll to thereby feed the tape past the severing mechanism, means operable automatically for moving the vertically movable feed roll away from the driven feed roll upon an opaque area on said tape moving into the line of sight of the light rays, cam controlled means for operating the severing mechanism upon said tape being advanced by the tape feed rolls to sever and position a label upon the label positioning plate, means for returning the label positioning plate to its original position, means operable automatically upon said label positioning plate returning to its original position for initiating movement of the vertically movable feed roll towards the driven feed roll to thus move the tape and its corresponding opaque area out of the line of sight of the light rays to thus permit the photoelectric mechanism to again function to complete a cycle in the operation of said photoelectric mechanism.

9. In a winding machine having a frame and a driven shaft rotatably mounted on the frame, a flyer support means fixed on the driven shaft and extending substantially radially therefrom, a forwardly extending flyer mounted on the flyer support means, means for directing yarn to said flyer, a substantially disk-shaped skein holder support mounted on the end of said driven shaft forwardly of said flyer support means and in which said driven shaft has rotational movement, whereby the flyer revolves about the skein holder support, a pair of diametrically opposed skein holder bars spaced from each other, means securing the skein holder bars to the support member, a locking device associated with said skein holder bars to prevent rotation of said bars and the skein holder support member comprising a pair of guide members fixed on said frame and disposed astride the skein holder bars and spaced therefrom sufficiently to permit the flyer, upon rotation thereof, to pass between the means for securing the skein holder bars to the skein holder support and the corresponding guide member, a reciprocable member slidably mounted in the means for securing the skein holder bars to the support, means for imparting reciprocatory movement to the reciprocable member in timed relation to rotation of the flyer and said reciprocable member being of such length as to alternately project beyond the opposed sides of the means for securing the skein holder bar to the skein holder support and into the corresponding guide member as the flyer moves between the other of the guide members and the means for securing the skein holder bars to the skein holder support, whereby the yarn from the flyer is wound about the skein holder bars and rotation of the skein holder bars is prevented by virtue of the reciprocable member alternately entering the guide members disposed adjacent opposed sides of the means securing the skein holder bars to the skein holder support.

10. In a structure according to claim 9, said reciprocable member comprising a block slidably engaging the front face of said skein holder support and having a groove in the rear surface thereof, a follower member eccentrically mounted on the end of said shaft and disposed within said groove in said block, a pair of shaft portions projecting from opposed sides of said block and slidably penetrating the means for securing the skein holder bars to the skein holder support, said guide members having cavities in their proximate surfaces coinciding with the outer ends of the shaft portions projecting from said block, said shaft portions being of such length relative to the skein holder support that the outer end of one of the shaft portions is spaced from the corresponding guide member as the outer end of the other of the shaft portions is disposed within the cavity in the other of the guide members and vice versa, whereby, upon rotation of said shaft, the follower member mounted on the end of said shaft rides in the groove on said block thereby causing the block to reciprocate transversely of the axis of said driven shaft to, in turn, cause the shaft portions to reciprocate therewith and alternately enter the guide members at opposed sides of the means for securing the skein holder bars to the skein holder support to thus permit the flyer to pass between the outer end of one of the shaft portions and the corresponding guide member when the other of the shaft portions is disposed within the cavity in the other of the guide members, and vice versa, thus preventing rotation of the skein holder bars and the support during rotation of the driven shaft and the flyer.

11. In a winding machine having a frame and a driven shaft rotatably mounted on the frame, a flyer support means fixed on the driven shaft and extending substantially radially therefrom, a forwardly extending flyer mounted on the flyer support means, means for directing yarn to said flyer, a substantially disk-shaped skein holder mounted on the end of said driven shaft forwardly of said flyer support means and in which said driven shaft has rotational movement, whereby the flyer revolves about the skein holder support, a pair of diametrically opposed skein holder bars spaced from each other, means securing the skein holder bars to the support member, a locking device associated with said skein holder bars to prevent rotation of said bars and the skein holder support member comprising a pair of guide members fixed on said frame and disposed astride the skein holder bars and spaced therefrom sufficiently to permit the flyer, upon rotation thereof, to pass between the means for securing the skein holder bars to the skein holder support and the corresponding guide member, a reciprocable member slidably mounted in the means for securing the skein holder bars to the support, means for imparting reciprocatory movement to the reciprocable member in timed relation to rotation of the flyer and said reciprocable member being of such length as to alternately project beyond the opposed sides of the means for securing the skein holder bar to the skein holder support and into the corresponding guide member as the flyer moves between the other of the guide members and the means for securing the skein holder bars to the skein holder support, whereby the yarn from the flyer is wound about the skein holder bars and rotation of the skein holder bars is prevented by virtue of the reciprocable member alternately entering the guide members disposed adjacent opposed sides of the means securing the skein holder bars to the skein holder support, said frame having a source of yarn thereon adjacent the end of the shaft remote from the end on which the flyer is mounted and a passageway extending longitudinally of said shaft through which the yarn is passed from the source to the flyer.

12. In a winding machine of the class described having a skein holder and also having means for winding yarn about the holder to form skein successively wherein each skein consists of a predetermined number of coils and said machine having means for advancing the skeins predetermined distances along the holder at the completion of the winding of each skein, means for placing a label about the central portion of each skein upon each skein being advanced to a predetermined station on the holder, means for positioning the intervening strand of yarn between adjacent skeins of yarn at a point against one side of the skein holder and at a point intermediate adjacent skeins, a strand locator fixed on the means for advancing the skeins predetermined distances and so arranged as to be alined with the previously positioned portion of the intervening strand at the edge of the skein holder and for advancing the said portion of the intervening strand to a station beyond said predetermined station, severing means also carried by the means for advancing the skeins and movable inwardly towards the skein holder for severing the said portion of the intervening strand after the label has been placed about the corresponding skein and upon a subsequent operation of said means for advancing the skeins.

13. In a structure according to claim 12, a substantially U-shaped skein handling member having inwardly biased legs engaging opposed sides of the skein holder at the end thereof remote from the end at which the yarn is initially wound about the skein holder and onto which the labeled skeins may be slid from the skein holder by an operator and subsequent to which the skein handling member may be removed from the skein holder with the labeled skeins thereon to facilitate depositing the skeins in a suitable container by sliding the skeins off the legs of the substantially U-shaped skein handling member.

14. In a winding machine of the type described, the combination of a skein holder comprising two skein holder bars arranged side-by-side and spaced apart, said bars being spaced equally from opposed sides of a common axis, a driven shaft disposed in axial alinement with said common axis, a flyer carried by said driven shaft and having a forwardly projecting arm thereon rotatable with the flyer to traverse a path in the form of a circle surrounding said bars, a skein holder support slidably penetrated by said shaft and to which the two bars are secured, stationary guide members disposed adjacent the outer surfaces of said bars and spaced therefrom, a reciprocating locking device carried by the skein holder support and alternately engaging the guide member adjacent one of the bars while being free of the guide member adjacent the other of the bars and vice versa to permit the arm on the flyer to pass between the guide members and the reciprocating locking device during rotation thereof for winding a yarn over corresponding ends of the bars to form a skein.

15. In a structure according to claim 14, means for feeding the skeins along the bars in predetermined spaced relation to each other as each successive skein is formed comprising a skein transfer bar normally spaced adjacent the outer surface of each of the skein holder bars and having a plurality of inwardly projecting longitudinally spaced skein transfer prongs thereon, a first cam controlled means for moving the skein transfer bars rearwardly and then forwardly as each skein is formed successively, a second cam controlled means for moving said skein transfer bars inwardly simultaneously toward the outer surfaces of the corresponding skein holder bars upon said first cam controlled means moving the skein transfer bars rearwardly, said second cam controlled means also being operable to move the skein transfer bars outwardly immediately upon said skein transfer bars being moved forwardly by the first cam controlled means to thereby move the prongs on the skein transfer bars out of engagement with the corresponding skeins after advancing said skeins forwardly a predetermined distance in predetermined spaced relation to each other.

16. In a winding machine of the type described, the combination of a skein holder comprising at least two skein holder bars arranged side-by-side and spaced apart in substantially diametrically opposed relation to a common axis, a flyer revoluble about said common axis and having means for directing yarn about corresponding ends of the skein holder bars to form skeins successively, means for supporting the skein holder bars at the ends thereof adjacent said flyer including a transversely reciprocable member, means connecting said bars with said reciprocable member to permit reciprocation of the reciprocable member transversely of said bars, guide means spaced outwardly of the path of travel of the flyer and being provided with openings coinciding with opposed ends of said reciprocable member for slidably receiving opposed ends of the reciprocable member, the reciprocable member being of such length that one end thereof is spaced from one of the guide means as the other end thereof is disposed within the opening in the corresponding guide means, means for imparting reciprocatory movement to the reciprocable member in timed relation to rotation of the flyer whereby the flyer passes between a corresponding end of the reciprocable member and one of the guide means as the other end of the reciprocable member is disposed within the opening in said guide means, means carried by the reciprocable member for engaging each coil of yarn successively wound on the skein holder bars at a point substantially remote from the flyer for pressing the coils together for maintaining them in side-by-side relation, a first cam controlled means operable in timed relation to the flyer upon a predetermined number of coils of yarn being wound about the skein holder bars for advancing successive skeins formed from said yarn along the bars in predetermined spaced relation to each other, a label applying station spaced substantially from the ends of said bars adjacent which the coils are fed thereto, means for successively feeding labels to a point above the path of travel of the skeins and between the ends of said skein holder bars at which the coils of yarn are fed thereto and the label applying station, a label positioning plate disposed above the skein holder bars and onto which one edge of each successive label is positioned, a second cam controlled means for clamping the corresponding edge of said label upon the label being admitted to the positioning plate, a third cam controlled means for moving the label positioning plate forwardly to position the corresponding label above the label applying station, a fourth cam controlled means operable upon said label being positioned above the label applying station for releasing the label from the clamping means, a fifth cam controlled means operable simultaneously with the fourth cam controlled means for moving said label downwardly, bunching the medial portion of the corresponding skein of yarn together and simultaneously folding the label about the corresponding skein, a sixth cam controlled means for moving opposed edges of the label over the underside of the corresponding skein in overlapping relation, a seventh cam controlled means for securing the overlapping edges together, a strand separating means carried by the fourth cam controlled means and operable upon each skein being advanced adjacent the label applying station for positioning the intervening portion of yarn extending between adjacent skeins at a point spaced from adjacent skeins at the outer edge of one of the skein holder bars and a cutting member carried by the first cam controlled means for severing the intervening portion of yarn positioned at the outer edge of the corresponding skein holder bar simultaneously with subsequent advancement of skeins of yarn along the skein holder bars and after the label has been applied to the corresponding skein.

NEWMAN McINTYRE.

REFERENCES CITED

The following references are of record in the file of this patent:

UNITED STATES PATENTS

| Number | Name | Date |
|---|---|---|
| 2,331,004 | Standish | Oct. 5, 1943 |
| 2,527,662 | Stevens | Oct. 31, 1950 |

FOREIGN PATENTS

| Number | Country | Date |
|---|---|---|
| 101,457 | Germany | Feb. 23, 1898 |